United States Patent [19]
Ito et al.

[11] Patent Number: 5,463,499
[45] Date of Patent: Oct. 31, 1995

[54] ZOOM LENS SYSTEM

[75] Inventors: Takayuki Ito, Tokyo; Tetsuya Abe, Hokkaido, both of Japan

[73] Assignee: Asahi Kogaku Kogyo Kabushiki Kaisha, Tokyo, Japan

[21] Appl. No.: 1,745

[22] Filed: Jan. 7, 1993

[30] Foreign Application Priority Data

Jan. 14, 1992 [JP] Japan .................................. 4-042495

[51] Int. Cl.$^6$ ................................................. G02B 15/14
[52] U.S. Cl. ............................................................ 359/692
[58] Field of Search ............................................. 359/692

[56] References Cited

U.S. PATENT DOCUMENTS

| | | |
|---|---|---|
| 4,099,846 | 7/1978 | Kawamura et al. . |
| 4,906,077 | 3/1990 | Ito . |
| 4,909,613 | 3/1990 | Kikuchi . |
| 4,936,661 | 6/1990 | Betensky et al. . |
| 5,071,235 | 12/1991 | Mori et al. . |
| 5,270,867 | 12/1993 | Estelle ..................... 359/692 |

FOREIGN PATENT DOCUMENTS

| | | |
|---|---|---|
| 3902495 | 8/1989 | Germany . |
| 4030757 | 4/1991 | Germany . |
| 63-311224 | 12/1988 | Japan . |
| 2237403A | 1/1991 | United Kingdom . |
| 2240637A | 8/1992 | United Kingdom . |

OTHER PUBLICATIONS

French Search Report FR 9300275.
English Abstract of Japanese Patent 63–311224.
Great Britain Search Report GB 9300381.2 dated Mar. 11, 1993.

*Primary Examiner*—Edward K. Look
*Assistant Examiner*—Christopher Verdier
*Attorney, Agent, or Firm*—Sughrue, Mion, Zinn, Macpeak & Seas

[57] ABSTRACT

A zoom lens system for use with compact cameras which is compact and yet effectively corrects chromatic aberrations, includes, in order from the object side, a first lens group having a positive focal length and a second lens group having a negative focal length, the inter-group distance being varied to perform zooming. The first lens group includes, in order from the object side, a first subgroup having a small power and a second subgroup having a large positive power. At least one of the subgroups is a cemented lens having a divergent surface, with an aspheric surface being provided in the first subgroup. The first lens group satisfies the following conditions $-0.7 < fS/f1a < 0.3$ $1.2 < fS/f1b < 2.3$ $-1.7 < fS/fc < 0$ where:
fS=the overall focal length at wide angle,
f1a=the focal length of the first subgroup,
f1b=the focal length of the second subgroup.

15 Claims, 16 Drawing Sheets

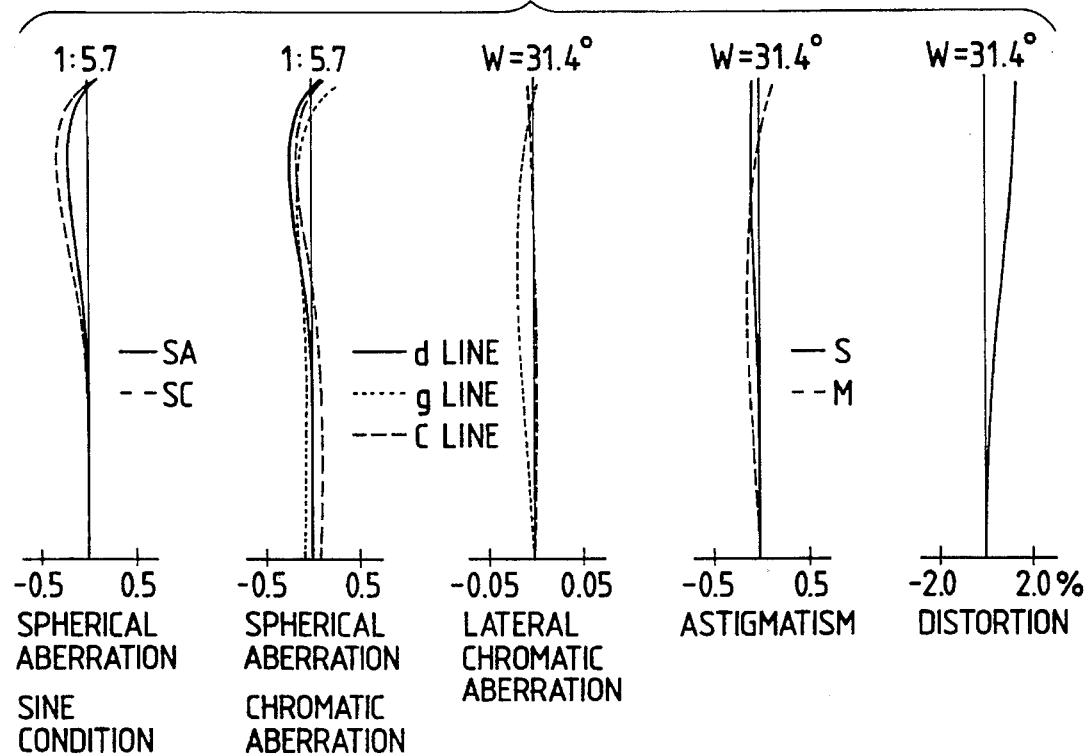
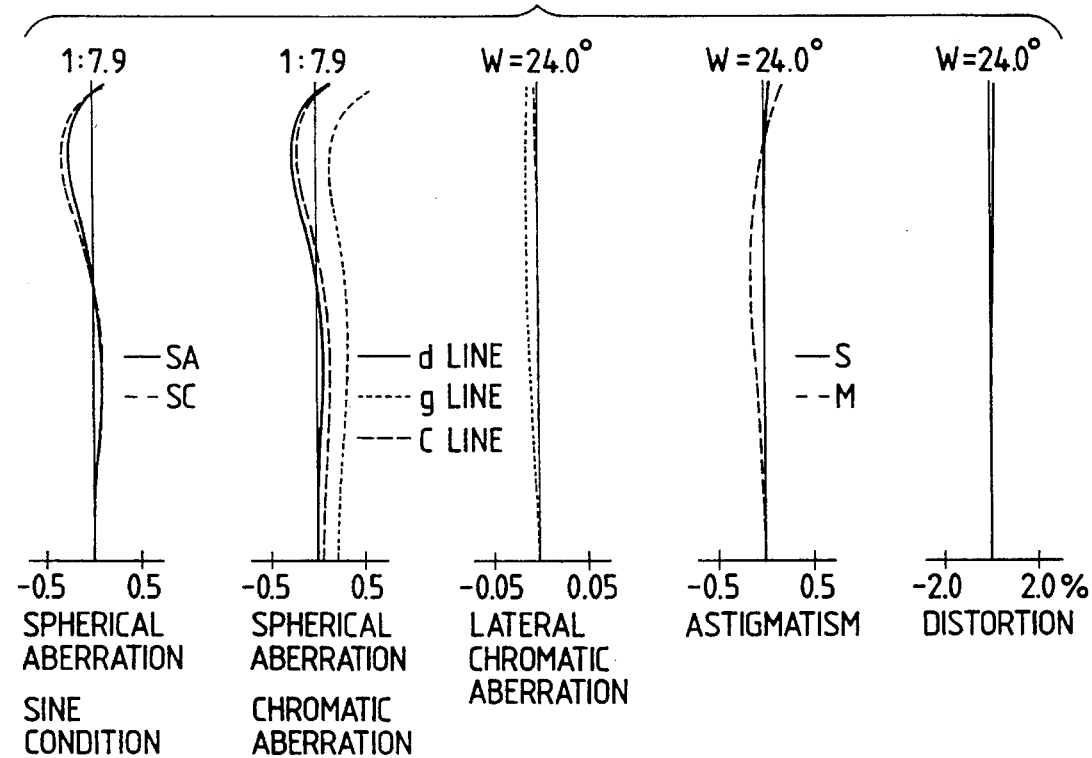

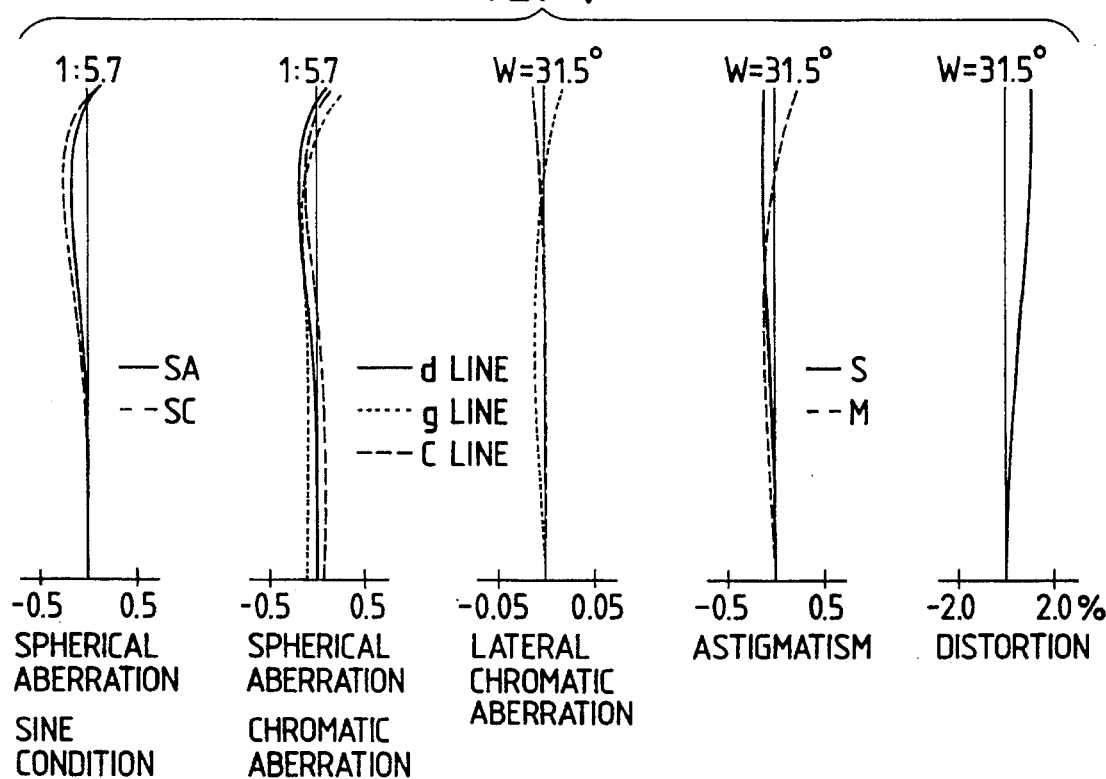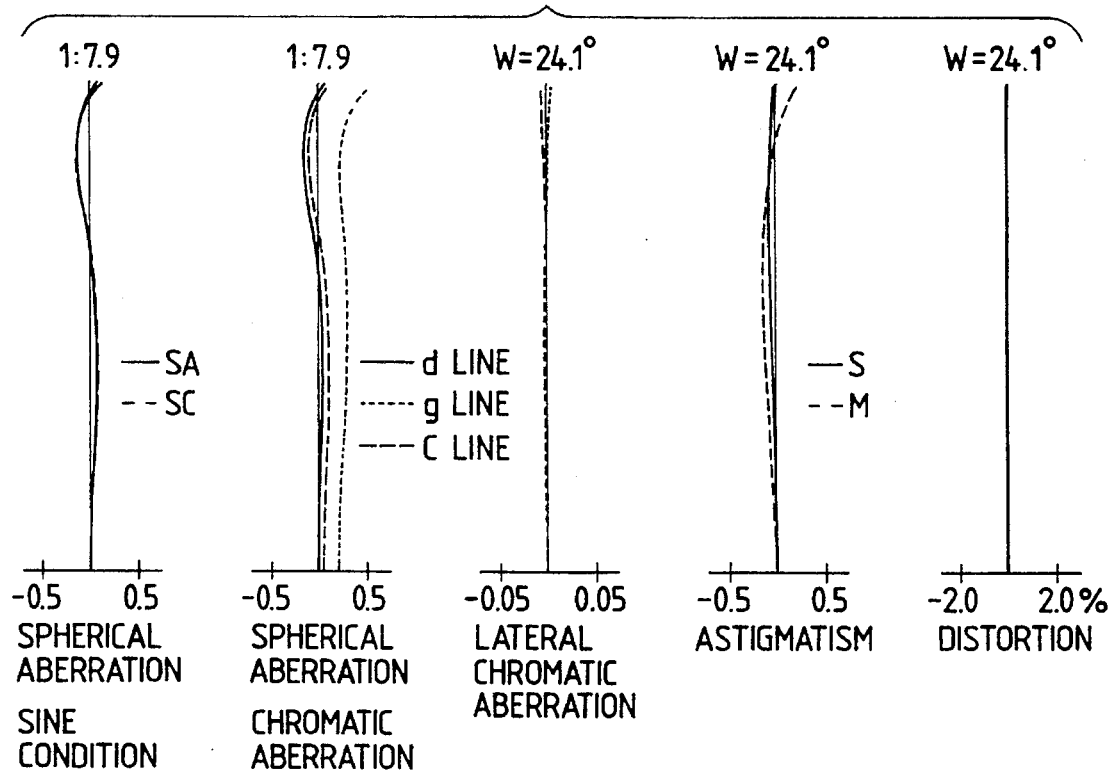

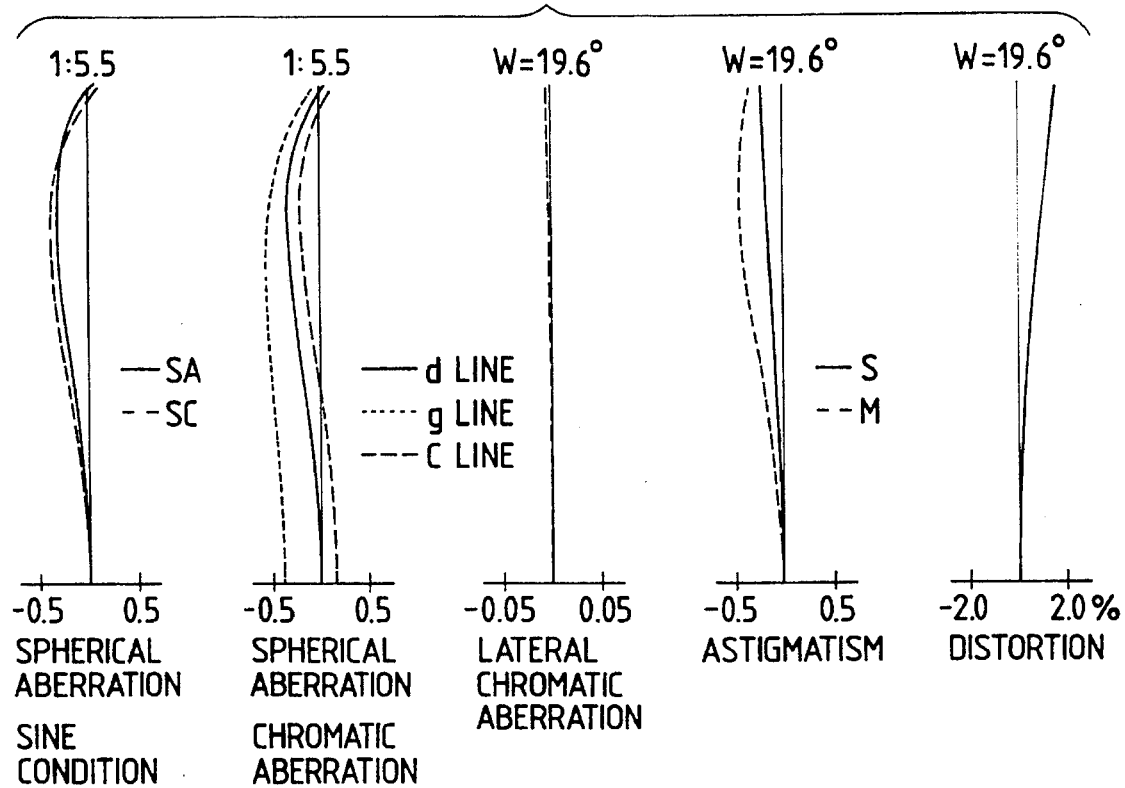
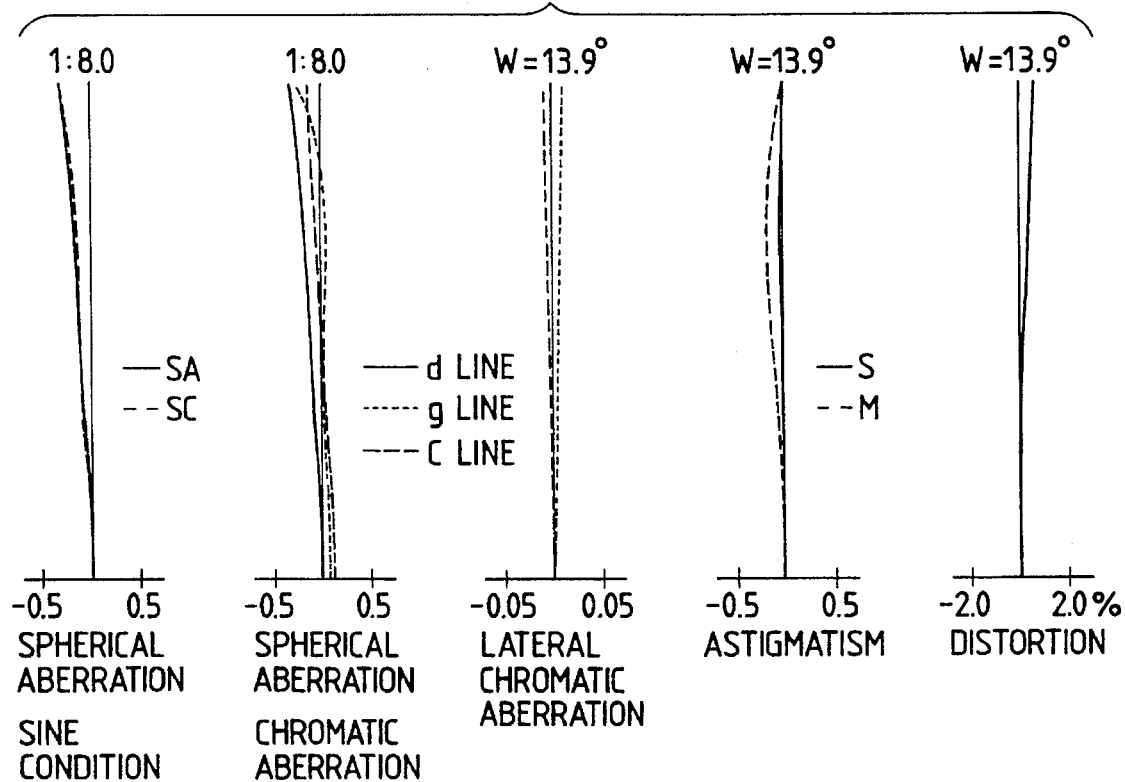

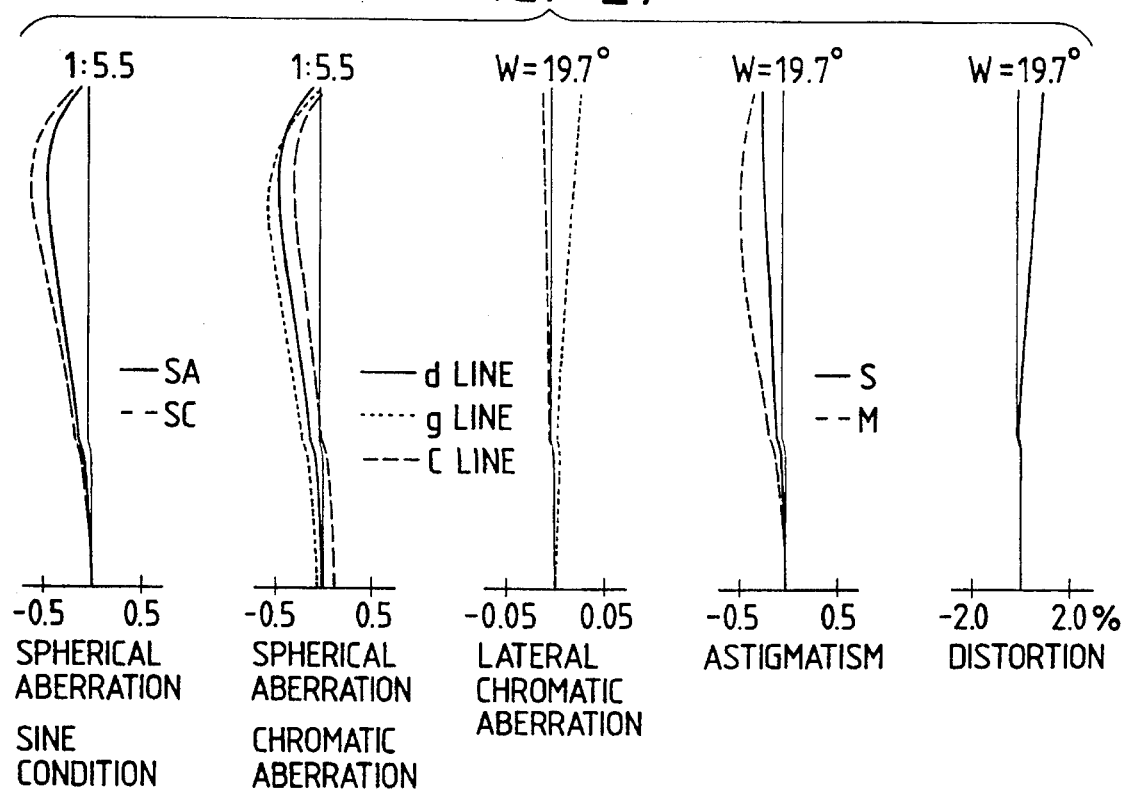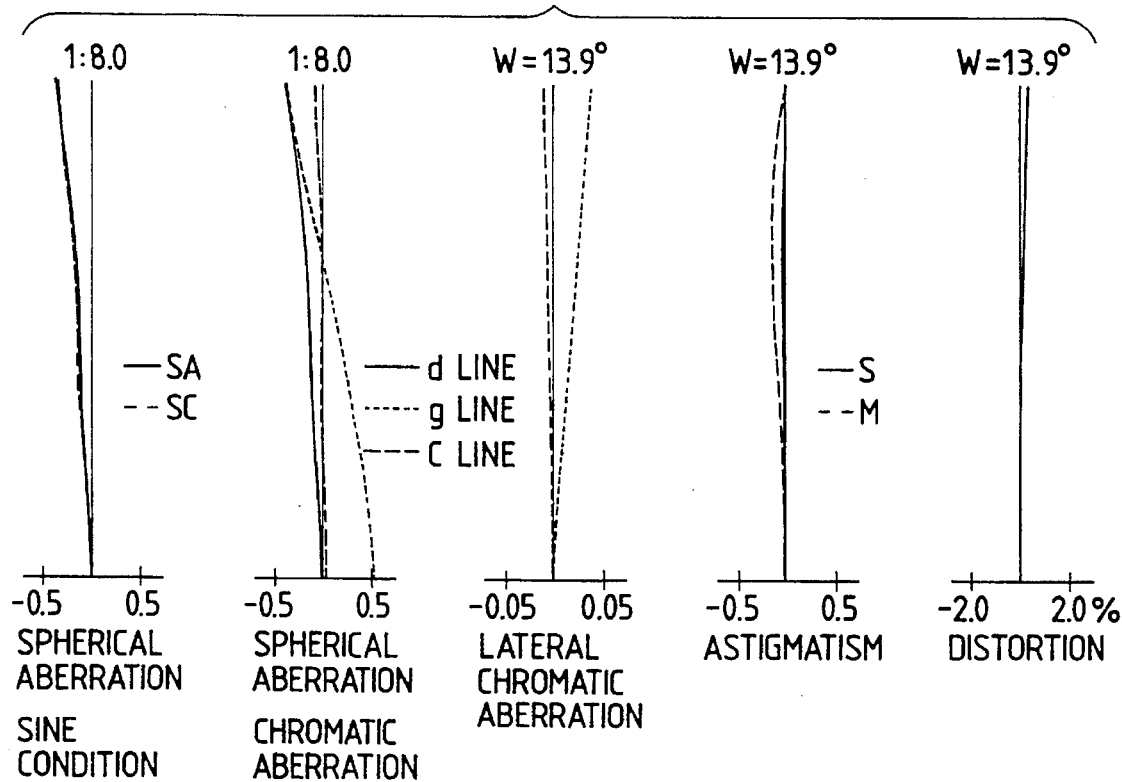

ZOOM LENS SYSTEM

BACKGROUND OF THE INVENTION

The present invention relates to a small zoom lens system for use with compact cameras that has a smaller constraint on its back focus than a zoom lens for use with single-lens reflex cameras.

Heretofore, a class of two-group zoom lens systems that do not employ aspheric surfaces have been used with compact cameras. An example of these types of systems is one in which the first lens group is composed of several elements, and the second lens group is composed of about three elements. Thus, the exemplary system has about eight elements (see commonly-assigned Japanese Patent Laid-Open Publication No. SHO 62-264019).

Another class of conventional zoom lens systems for use with compact cameras includes one that uses numerous aspheric surfaces and in which the first and second lens groups are each composed of two elements, thereby resulting in a system having four elements total (see commonly-assigned Japanese Patent Laid-Open Publication No. HEI-3-127008), as well as one which is composed of fewer lens elements, such as two or three in total number.

However, the conventional zoom lens systems for use with compact cameras have had various problems. Two-group systems that do not use aspheric surfaces need so many lens elements that making the system compact is difficult.

With four-element systems that have numerous aspheric surfaces, it is difficult to attain balance between reduction in the overall lens length and correction of chromatic aberrations.

Two- or three-element systems have a generally poor performance. Furthermore, it has been difficult to attain balance between reduction in the overall lens length and correction of chromatic aberrations.

Therefore, an object of the present invention is to provide a zoom lens system for use with compact cameras which is compact (i.e., has relatively fewer lens elements) and yet which effectively corrects chromatic aberrations.

SUMMARY OF THE INVENTION

To attain the above-described object, the zoom lens system of the present invention comprises, in order from the object side, a first lens group having a positive focal length and a second lens group having a negative focal length, the distance between the first and second lens groups being varied to perform zooming. The first lens group comprises, in order from the object side, a subgroup $1a$ having a small power and a subgroup $1b$ having a large positive power, at least one of the subgroups $1a$ and $1b$ being a cemented lens having a divergent cemented surface, and at least one lens surface of the subgroup $1a$ being aspheric. The first lens group satisfies the following conditions (a1), (b1) and (c):

$$-0.7 < fS/f1a < 0.3 \quad \text{(a1)}$$

$$1.2 < fS/f1b < 2.3 \quad \text{(b1)}$$

$$-1.7 < fS/fc < 0 \quad \text{(c)}$$

where fS: the focal length of the overall system at the wide-angle end;

f1a: the focal length of subgroup $1a$;

f1b: the focal length of subgroup $1b$;

fc: the focal length of the cemented surface in the first lens group and fc=rc/(Nr−Nf); and where rc: the radius of curvature of the cemented surface;

Nr: the refractive index at the d-line of the lens element on the image side of the cemented surface; and Nf: refractive index at the d-line of the lens element on the object side of the cemented surface.

BRIEF DESCRIPTION OF THE DRAWINGS

FIG. 3 illustrates a set of graphs plotting the aberration curves obtained with the lens system of Example 1 at the middle-angle end;

FIG. 4 illustrates a set of graphs plotting the aberration curves obtained with the lens system of Example 1 at the narrow-angle end;

FIG. 7 illustrates a set of graphs plotting the aberration curves obtained with the lens system of Example 2 at the middle-angle end;

FIG. 8 illustrates a set of graphs plotting the aberration curves obtained with the lens system of Example 2 at the narrow-angle end;

FIG. 23 illustrates a set of graphs plotting the aberration curves obtained with the lens system of Example 6 at the middle-angle end;

FIG. 24 illustrates a set of graphs plotting the aberration curves obtained with the lens system of Example 6 at the narrow-angle end;

FIG. 27 illustrates set of graphs plotting the aberration curves obtained with the lens system of Example 7 at the middle-angle end;

FIG. 28 illustrates a set of graphs plotting the aberration curves obtained with the lens system of Example 7 at the narrow-angle end;

DETAILED DESCRIPTION OF THE PREFERRED EMBODIMENTS

Figure 1:
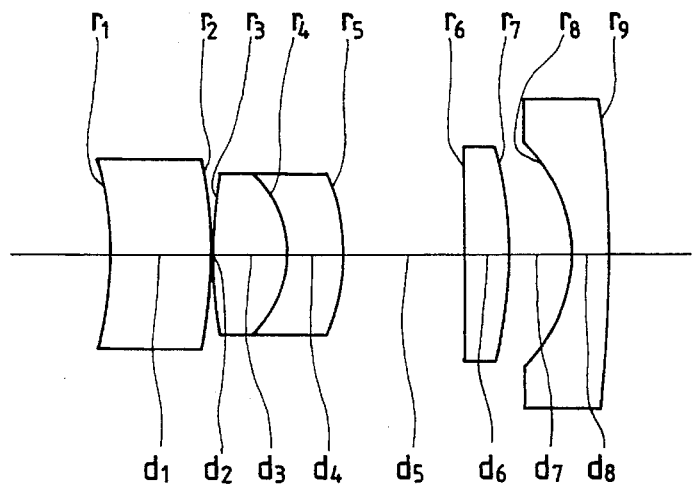
FIG. 1 is a simplified cross-sectional view of the zoom lens system according to Example 1 at the wide-angle end.

By using aspheric lenses and cemented lenses, the present invention successfully provides zoom lens systems for use with compact cameras that are compact and have fewer lens elements, as compared to the conventional systems, and yet which effectively correct chromatic aberrations. Compared to a first lens group being composed of two elements in two units, the zoom lens system of the present invention has a smaller size and greater efficiency in correcting chromatic aberrations.

By providing the cemented surface or surfaces with a divergent negative power, the dependency on aspheric surfaces can be reduced, thereby making it easy to manufacture aspheric lenses.

Condition (a1) relates to the power of subgroup 1a having a small power. If the upper limit of this condition is met or exceeded, the positive power of subgroup 1a will increase and the back focus will become so short as to make correcting distortion difficult. If the lower limit of condition (a1) is not exceeded, the negative power of subgroup 1a will increase. However, the first lens group taken as a whole requires a positive power, so the positive power of subgroup 1b must be considerably increased if subgroup 1a has a large negative power. This makes correcting spherical aberration difficult.

Condition (b1) relates to the power of subgroup 1b which functions as a master lens. If the upper limit of this condition is met or exceeded, the power of subgroup 1b will increase, causing greater variations in spherical aberration. If the lower limit of condition (b1) is not exceeded, the result is advantageous for correcting aberrations, but the amount of movement required for zooming will increase.

Condition (c) relates to the power of the cemented surface and it must be satisfied to efficiently correct chromatic aberrations and to reduce the overall size of the lens system. If the upper limit of this condition is met or exceeded, overcorrection will occur to produce spherical aberrations of higher orders. If the lower limit of condition (c) is not exceeded, chromatic aberrations will be undercorrected.

If subgroup 1b has a cemented lens, the following condition (a2), (b2) and (d) are preferably satisfied:

$$-0.7 < fS/f1 < 0 \quad (a2)$$

$$1.2 < fS/f2\text{-}3 < 2.3 \quad (b2)$$

$$-1.7 < fS/fcb < -0.3 \quad (d)$$

f2-3: the focal length of subgroup 1b;

fcb: the focal length of the cemented surface in subgroup 1b and fcb=rcb/(N3−N2); and where rcb: the radius of curvature of the cemented surface;

N2: the refractive index of the second lens element at the d-line; and

N3: the refractive index of the third lens element at the d-line.

If subgroup 1a has a cemented lens, the following conditions (a3), (b3) and (e) are preferably satisfied:

$$-0.3 < fS/f1\text{-}2 < 0.3 \quad (a3)$$

$$1.2 < fS/f3 < 2.3 \quad (b3)$$

$$-0.7 < fS/fca < 0 \quad (e)$$

where f1-2: the focal length of subgroup 1a;

f3: the focal length of subgroup 1b;

fca: the focal length of the cemented surface in subgroup 1a and fca=rca/(N2−N1); and where rca: the radius of curvature of the cemented surface; and N1: the refractive index of the first lens element at the d-line.

If subgroups 1a and 1b both have a cemented lens, the following conditions (a4), (b4) and (f) are preferably satisfied:

$$-0.3 < fS/f1\text{-}2 < 0.3 \quad (a4)$$

$$1.2 < fS/f3\text{-}4 < 2.3 \quad (b4)$$

$$-1.7 < fS/fcb < -0.3 \quad (f)$$

where f1-f2: the focal length of subgroup 1a;

f3-4: the focal length of subgroup 1b;

fcb: the focal length of the cemented surface in subgroup 1b and fcb=rcb/(N4−N3); and where N4: the refractive index of the fourth lens element at the d-line.

The combinations of conditions (a2), (b2) and (d), conditions (a3), (b3) and (e), and conditions (a4), (b4) and (f) will perform the same functions as the combination of conditions (a1), (b1) and (c).

When subgroups 1a and 1b both have a cemented lens, an aspheric surface having a large negative divergent power is preferably provided in the cemented lens forming subgroup 1b having a large positive power.

To ensure that the first lens group will have an increased power while reducing the number of constituent lens elements sufficiently to achieve the desired size reduction, the lens surface closest to the object is preferably made concave.

This is particularly advantageous when the first lens group is designed as a retrofocus type of short overall length to assure a wider view angle at the short-focus end.

The first lens of the first lens group preferably satisfies the following condition (g) which specifies the degree of curvature of the surface of the surface that faces the object:

$$-15 < SF1 < -0.3 \qquad (g)$$

where

SF1: the shape factor of the first lens element of the first lens group and SF1=(r1+r2)/(r1-r2); and where r1: the radius of curvature of the first surface of the first lens element; and r2: the radius of curvature of the second surface of the first lens element.

If the lower limit of this condition is not exceeded, the concave surface facing the object will have an excessive radius of curvature, leading to the development of higher-order aberrations. If the upper limit of condition (g) is met or exceeded, the power of the first lens group will not be able to be increased while keeping the overall size sufficiently small because it is difficult to correct aberrations or, alternatively, more constituent lens elements have to be used.

When subgroup 1a is provided with an aspheric surface, the zoom lens system of the present invention preferably satisfies the following additional condition (h) concerning the optical glass material to form the aspheric lens in subgroup 1a:

$$34 < va \qquad (h)$$

where va: the Abbe number of the first lens element of the first lens group.

If a glass molded aspheric lens is to be used as the first subgroup, it is difficult to manufacture it from an SF-type optical glass material. Hence, a glass material is desirably used which does not satisfy condition (h).

In the present invention, a cemented lens is used in either subgroup 1a or 1b or both, and which accomplishes achromatism easily without using an SF-type optical glass material in the aspheric lens.

When a cemented lens is used in subgroup 1b, the optical glass material for forming the negative lens element in subgroup 1b preferably satisfies the following condition (i):

$$vb < 34 \qquad (i)$$

where vb: the Abbe number of subgroup 1b (cemented lens).

By making the negative lens element in subgroup 1b of an SF type optical glass material that satisfies condition (i), desired achromatism can be accomplished by subgroup 1b without using an SF-type optical glass material in subgroup 1a which is provided with an aspheric surface.

In another preferred embodiment, the zoom lens system of the present invention may satisfy the following additional condition (j), which concerns the aspheric surface in subgroup 1a:

$$0 < \Delta V < 2 \qquad (j)$$

where $\Delta V$: the sum of variations in the coefficient of the third-order distortion due to the aspheric surface in subgroup 1a.

Generally, the shorter the overall length of the system, the more likely that a positive distortion will develop on the shorter-focus side.

Hence, if the upper limit of condition (j) is met or exceeded, over-correction will occur, increasing the likelihood of a greater distortion at a middle-angle end than at a maximum-angle end. If the lower limit of condition (j) is not exceeded, distortion will be insufficiently corrected.

Various modifications can be made without departing from the spirit of the present invention and they include, for example, a system in which subgroups 1a and 1b are movable independently of each other, as well as a system in which a lens group having a small power is provided behind the second lens group.

The following is a supplemental discussion of the amount of variation in the coefficient of the third-order aberration due to an aspheric surface. The shape of an aspheric surface can generally be expressed by equation (1):

$$x = \frac{cy^2}{1 + \sqrt{1-(1+K)c^2y^2}} + \alpha 4 y^4 + \alpha 6 y^6 + \alpha 8 y^8 + \alpha 10 y^{10} \qquad (1)$$

where x is the distance by which the coordinates at the point on the aspheric surface where the height from the optical axis is y, departs from the plane tangent to the vertex of the aspheric surface; c is the curvature (1/r) of the vertex of the aspheric surface; K is the conic constant; and $\alpha 4$, $\alpha 6$, $\alpha 8$ and $\alpha 10$ are the aspheric coefficients of the fourth, sixth, eighth and tenth orders, respectively.

By calculating the focal length as f=1.0, namely, by substituting x=x/f, y=y/f, c=fc, A4=$f^3\alpha 4$, A6=$f^5\alpha 6$, A8=$f^7\alpha 8$ and A10=$f^9\alpha 10$ into equation (1), the following equation (2) is obtained:

$$X = \frac{cY^2}{1 + \sqrt{1-(1+K)c^2Y^2}} + \qquad (2)$$

$$A4Y^4 + A6Y^6 + A8Y^8 + A10Y^{10}$$

The second and subsequent terms of equation (2) define the amount of sphericity and the relationship between the coefficient A4 of the second term and the third-order aspheric coefficient $\phi$ is expressed by:

$$\phi = 8(N'-N)A4$$

where N is the refractive index of the medium before the aspheric surface and N' is the refractive index of the medium after the aspheric surface. The aspheric coefficient $\phi$ provides the following amounts of variation in third-order aberration coefficients as referred to in the theory of aberrations:

$$\Delta I = h^4 \phi$$

$\Delta II = h^3 H \phi$ $\Delta III = h^2 H^2 \phi$ $\Delta IV = h^2 H^2 \phi$ $\Delta V = h H^3 \phi$ where I: a spherical aberration coefficient;

II: a coma coefficient;

III: an astigmatism coefficient;

IV: a sagittal field curvature coefficient;

V: a distortion coefficient;

h: the height of paraxial on-axis rays at which they pass through each lens surface; and H: the height of paraxial off-axis rays passing through the center of the pupil, at which they pass through each lens surface.

When the aspheric surface in subgroup 1a satisfies condition (j), the zoom lens system of the present invention preferably satisfies the following additional condition (k), which concerns the thickness of the first lens element:

$$0.1 < d1/fS < 0.3 \qquad (K)$$

where d1: the thickness of the first lens element of the first lens group.

Condition (k) should particularly be satisfied in order to provide a wider view angle. If the lower limit of this condition is not exceeded, difficulty is involved in providing a wider view angle. If the upper limit of condition (k) is met or exceeded, the thickness of the first lens will increase so much as to make it difficult to produce a lighter zoom lens system.

Examples 1 to 8 of the zoom lens system of the present invention are described below with reference to data sheets, in which f denotes the focal length, fB is the back focus, r is the radius of curvature of an individual lens surface, d is the lens thickness or the air-space between lenses (the foregoing parameters are in millimeters), FNO is the F number, ω is the half view angle (in degrees), n is the refractive index of an individual lens at the d-line, and ν is the Abbe number of an individual lens at the d-line, with the numbers for aspheric surfaces being marked with an asterisk. For each aspheric surface, $\alpha 4$, $\alpha 6$ and $\alpha 8$ (and $\alpha 10$, if any) denotes the aspheric coefficients of the fourth, sixth and eighth orders (and tenth orders, if any), respectively.

Example 1

Figure 2:
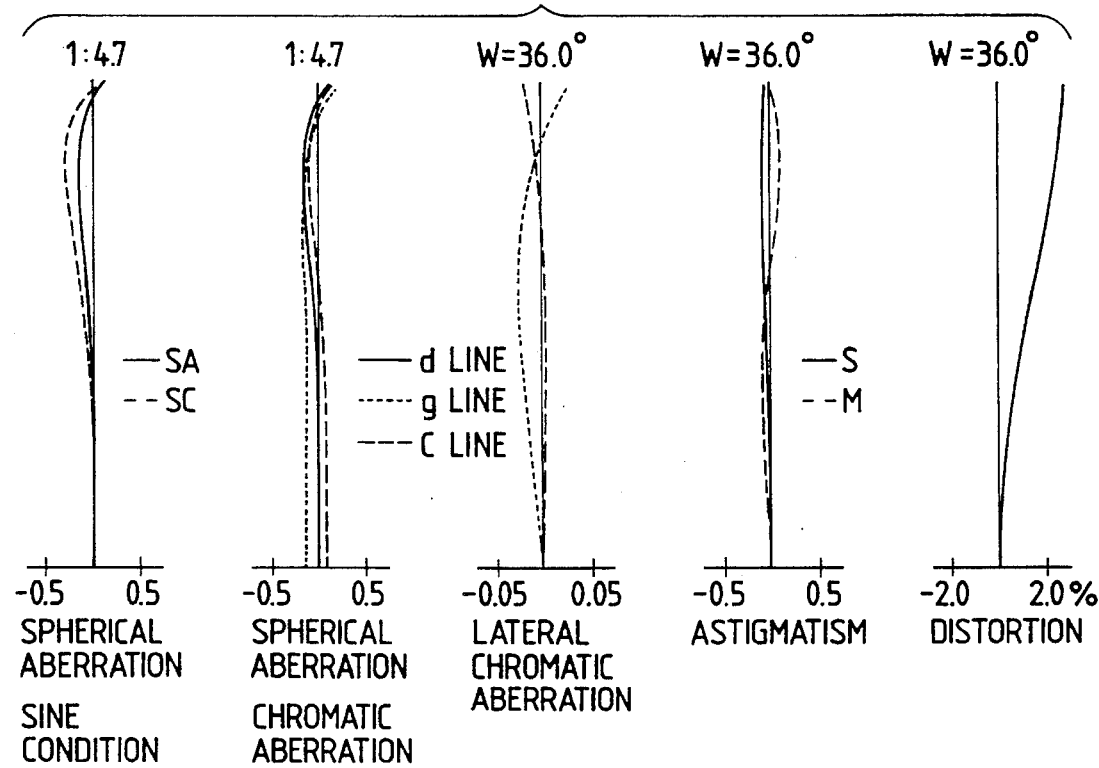
FIG. 2 illustrates a set of graphs plotting the aberration curves obtained with the lens system of Example 1 at the wide-angle end.

FIG. 1 is a simplified cross-sectional view of the zoom lens system according to Example 1 at the wide-angle end. Specific data for this example are as shown in Table 1. FIG. 2 shows a set of graphs plotting the curves of spherical aberration SA, sine condition SC, chromatic aberrations expressed by spherical aberration at the d-, g- and C- lines, lateral chromatic aberration, astigmatism (S, sagittal; M, meridional) and distortion, that are obtained with the lens system of Example 1 at the wide-angle end; FIG. 3 shows a set of graphs plotting the curves of the same parameters that are obtained at the middle-angle end; and FIG. 4 shows a set of graphs plotting the curves of the same parameters that are obtained at the narrow-angle end.

TABLE 1

| Surface No. | r | d | n | ν |
|---|---|---|---|---|
| 1* | −16.621 | 5.00 | 1.73077 | 40.5 |
| 2 | −22.148 | 0.10 | | |
| 3 | 24.706 | 3.54 | 1.53172 | 48.9 |
| 4 | −5.355 | 2.84 | 1.80518 | 25.4 |
| 5 | −9.087 | Variable | | |
| 6* | −66.142 | 2.10 | 1.58547 | 29.9 |
| 7 | −17.650 | 3.05 | | |
| 8 | −7.160 | 1.80 | 1.83481 | 42.7 |
| 9 | −52.228 | | | |

| First surface: aspheric | Sixth surface: aspheric |
|---|---|
| K = 0 | K = 0 |
| $\alpha_4 = -0.15769029 \times 10^{-3}$ | $\alpha_4 = 0.17904943 \times 10^{-3}$ |
| $\alpha_6 = 0.30802121 \times 10^{-5}$ | $\alpha_6 = 0.63433168 \times 10^{-6}$ |
| $\alpha_8 = -0.32510966 \times 10^{-7}$ | $\alpha_8 = 0.40777362 \times 10^{-7}$ |

The values of FNo., f, fB, ω and d5 vary with zooming, as shown in Table 2 below.

TABLE 2

| FNo. | 4.7 | 5.7 | 7.9 |
|---|---|---|---|
| f | 29.00 | 35.00 | 48.50 |
| fB | 12.11 | 17.71 | 30.31 |
| ω | 36.0 | 31.4 | 24.0 |
| d5 | 6.03 | 4.67 | 2.84 |

Example 2

Figure 5:
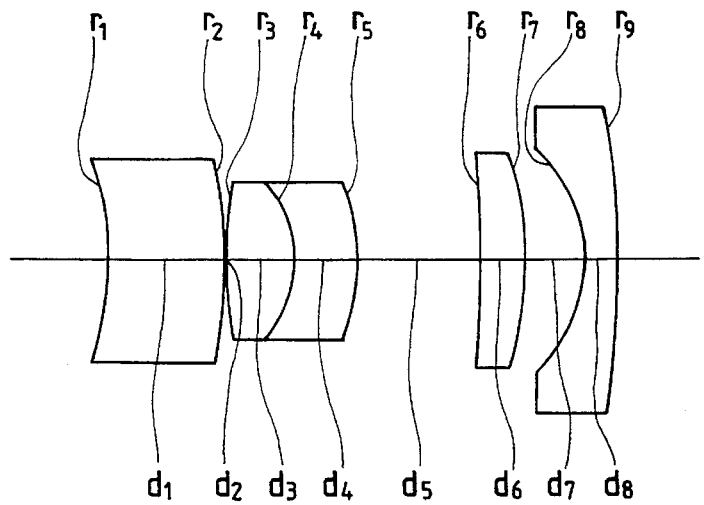
FIG. 5 is a simplified cross-sectional view of the zoom lens system according to Example 2 at the wide-angle end.
Figure 6:
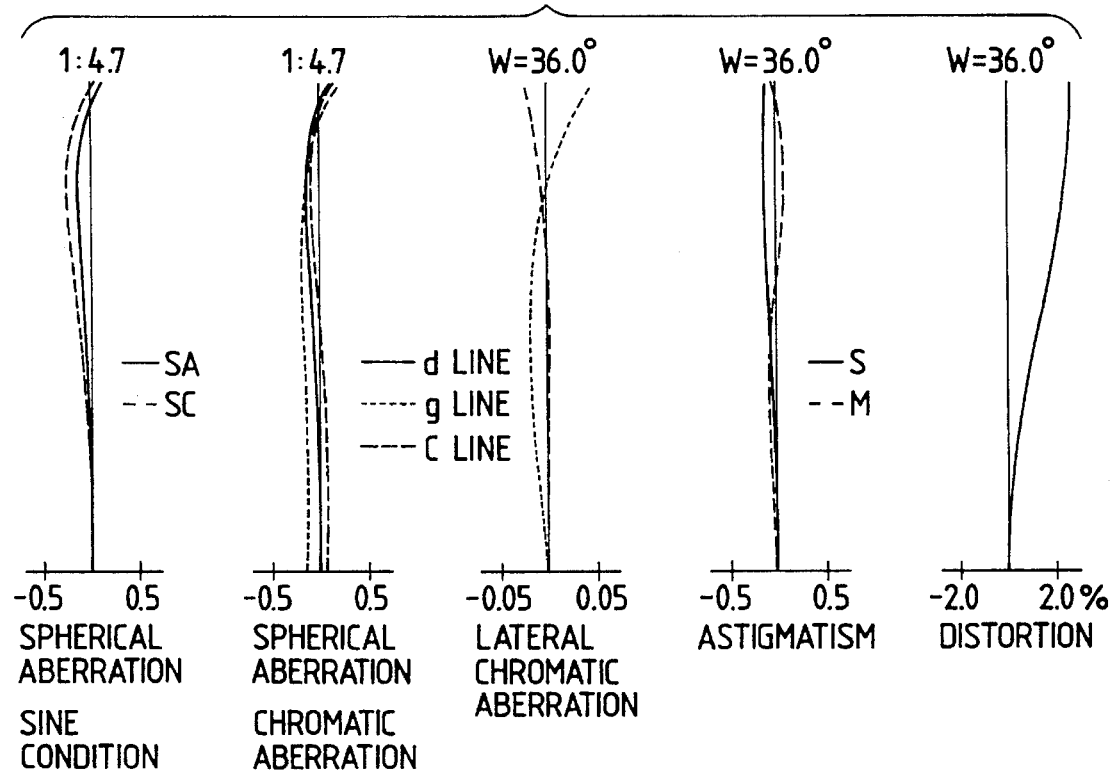
FIG. 6 illustrates a set of graphs plotting the aberration curves obtained with the lens system of Example 2 at the wide-angle end.

FIG. 5 is a simplified cross-sectional view of the zoom lens system according to Example 2 at the wide-angle end. Specific data for this example are as shown in Table 3. The aberration curves obtained with this lens system at the wide-angle, middle-angle and narrow-angle ends are plotted in FIGS. 6, 7 and 8, respectively.

TABLE 3

| Surface No. | r | d | n | ν |
|---|---|---|---|---|
| 1* | −16.014 | 5.69 | 1.58913 | 61.2 |
| 2 | −22.672 | 0.10 | | |
| 3 | 19.720 | 3.26 | 1.53172 | 48.9 |
| 4 | −5.724 | 3.00 | 1.80518 | 25.4 |
| 5 | −9.926 | Variable | | |
| 6* | −45.870 | 2.23 | 1.58547 | 29.9 |
| 7 | −15.519 | 2.95 | | |
| 8 | −7.032 | 1.50 | 1.83481 | 42.7 |
| 9 | −44.700 | | | |

| First surface: aspheric | Sixth surface: aspheric |
|---|---|
| K = 0 | K = 0 |
| $\alpha_4 = -0.12476019 \times 10^{-3}$ | $\alpha_4 = 0.16558446 \times 10^{-3}$ |
| $\alpha_6 = 0.26422229 \times 10^{-5}$ | $\alpha_6 = 0.12079021 \times 10^{-5}$ |
| $\alpha_8 = -0.23612453 \times 10^{-7}$ | $\alpha_8 = 0.37475794 \times 10^{-7}$ |

The values of FNo., f, fB, ω and d5 vary with zooming, as shown in Table 4 below.

TABLE 4

| FNo. | 4.7 | 5.7 | 7.9 |
|---|---|---|---|
| f | 29.00 | 35.00 | 48.50 |
| fB | 12.16 | 17.78 | 30.45 |
| ω | 36.0 | 31.5 | 24.1 |

TABLE 4-continued

| FNo. | 4.7 | 5.7 | 7.9 |
|---|---|---|---|
| d5 | 6.03 | 4.64 | 2.77 |

Example 3

Figure 9:
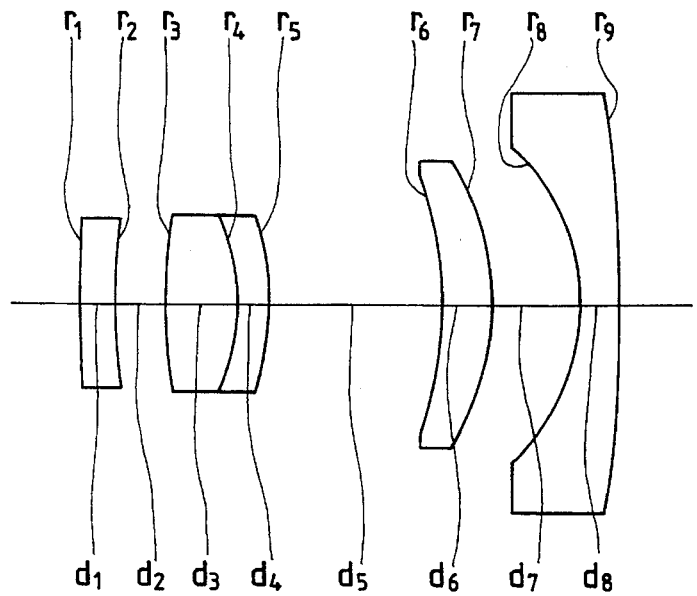
FIG. 9 is a simplified cross-sectional view of the zoom lens system according to Example 3 at the wide-angle end.
Figure 10:
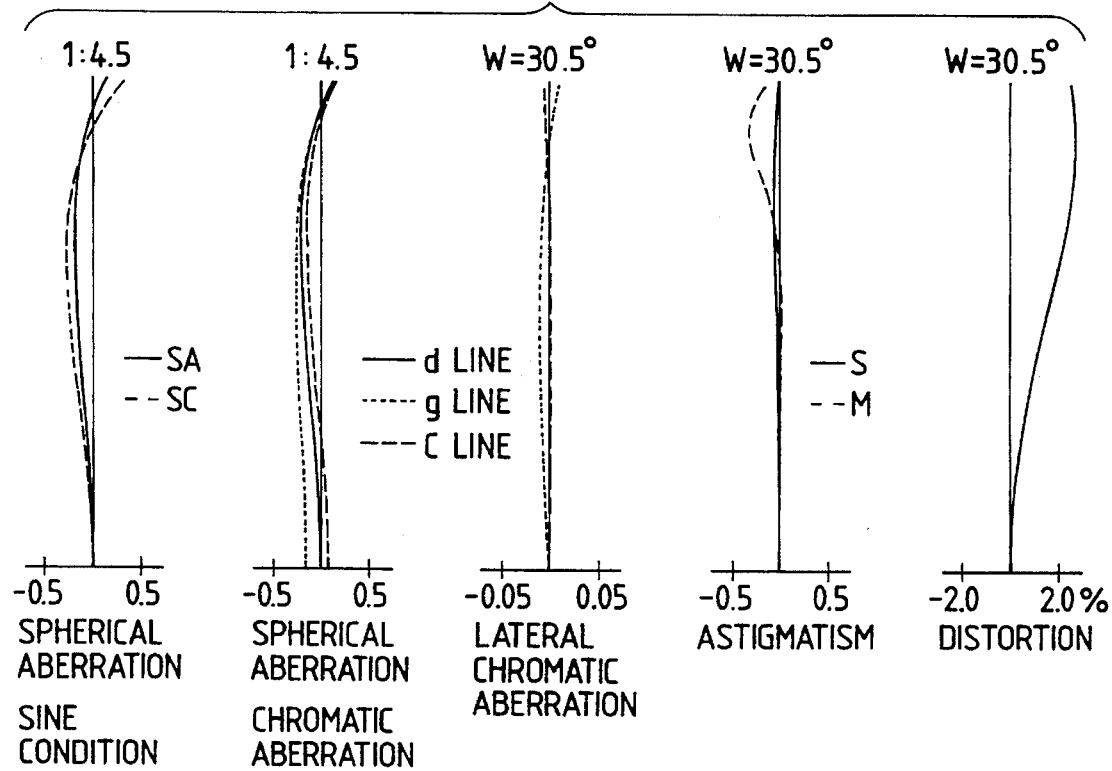
FIG. 10 illustrates a set of graphs plotting the aberration curves obtained with the lens system of Example 3 at the wide-angle end.
Figure 11:
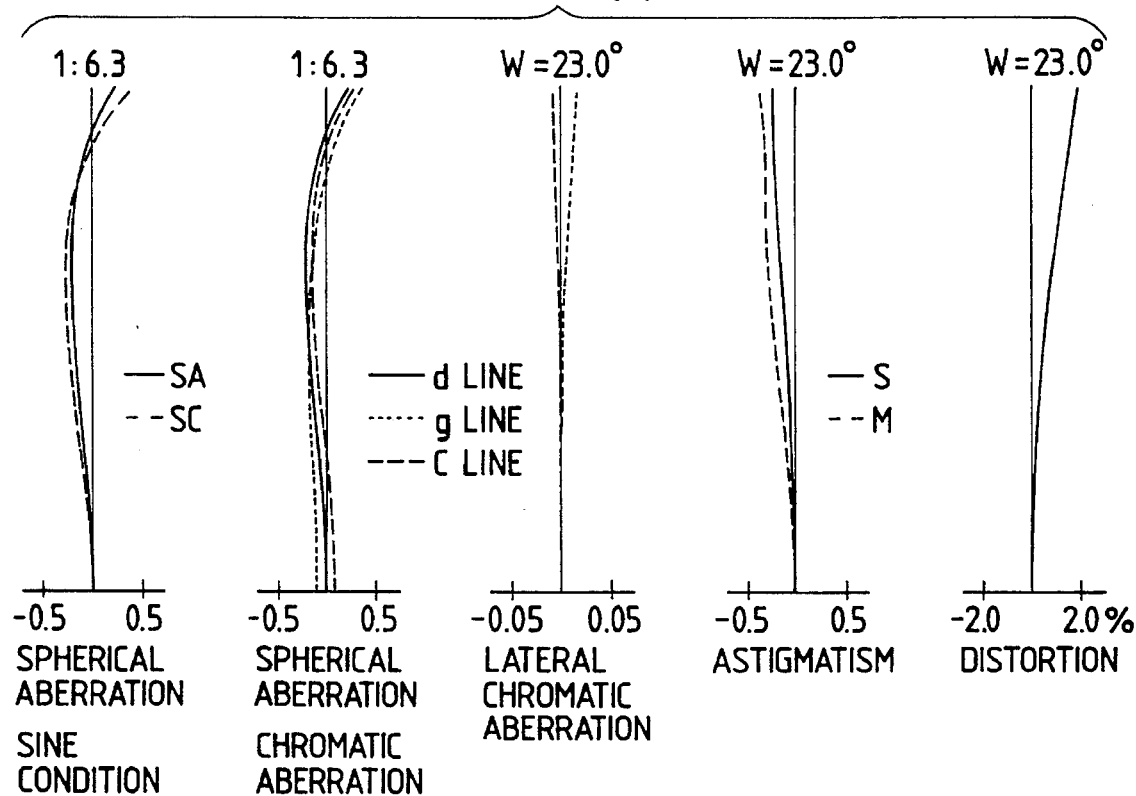
FIG. 11 illustrates a set of graphs plotting the aberration curves obtained with the lens system of Example 3 at the middle-angle end.
Figure 12:
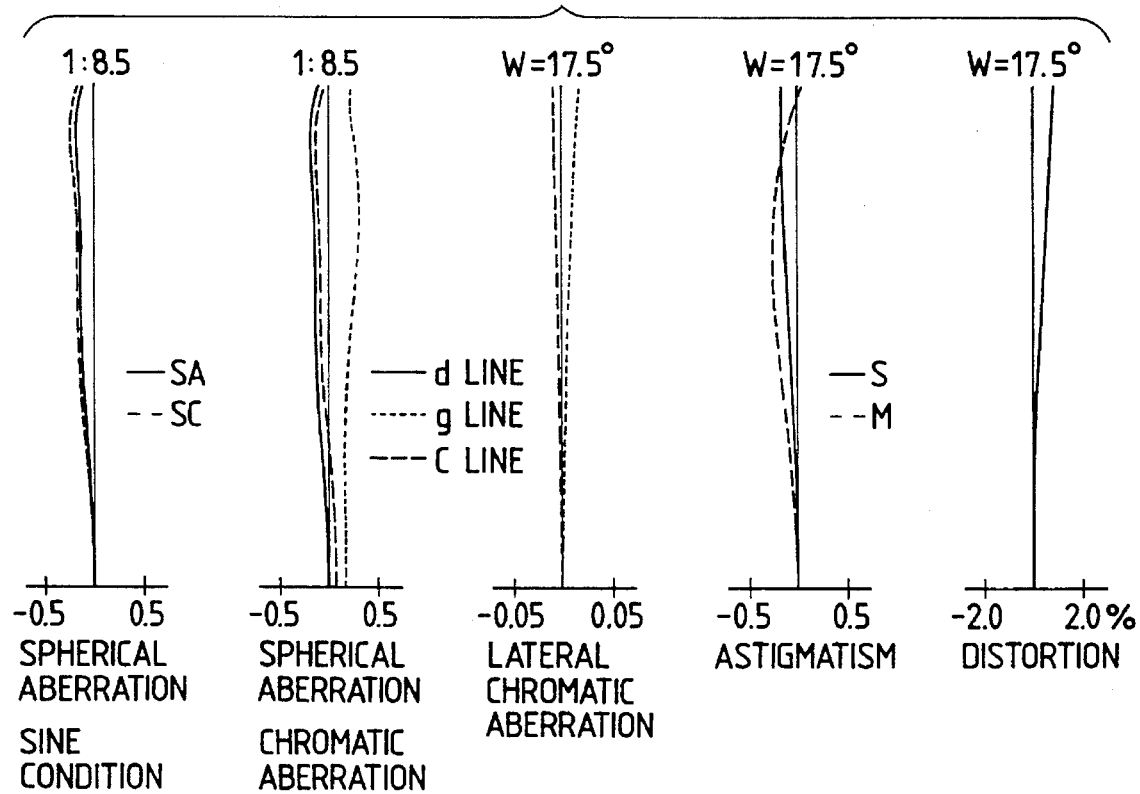
FIG. 12 illustrates a set of graphs plotting the aberration curves obtained with the lens system of Example 3 at the narrow-angle end.

FIG. 9 is a simplified cross-sectional view of the zoom lens system according to Example 3 at the wide-angle end. Specific data for this example are as shown in Table 5. The aberration curves obtained with this lens system at the wide-angle, middle-angle and narrow-angle ends are plotted in FIGS. 10, 11 and 12, respectively.

TABLE 5

| Surface No. | r | d | n | ν |
|---|---|---|---|---|
| 1* | 27.076 | 1.70 | 1.80518 | 25.4 |
| 2* | 17.353 | 2.54 | | |
| 3 | 23.110 | 3.50 | 1.51633 | 64.1 |
| 4 | −10.000 | 1.50 | 1.62004 | 36.3 |
| 5* | −12.606 | Variable | | |
| 6* | −16.804 | 2.50 | 1.58547 | 29.9 |
| 7 | −12.012 | 4.30 | | |
| 8 | −10.000 | 1.80 | 1.77250 | 49.6 |
| 9 | −129.785 | | | |

First surface: Aspheric $K = 0$
$\alpha_4 = -0.78071698 \times 10^{-3}$
$\alpha_6 = -0.38820565 \times 10^{-5}$
$\alpha_8 = 0.42306964 \times 10^{-7}$ Fifth surface: Aspheric $K = 0$
$\alpha_4 = 0.11275623 \times 10^{-3}$
$\alpha_6 = 0.25817645 \times 10^{-5}$
$\alpha_8 = -0.22261271 \times 10^{-7}$ Second surface: Aspheric $K = 0$
$\alpha_4 = -0.8932763 \times 10^{-3}$
$\alpha_6 = -0.15051096 \times 10^{-5}$
$\alpha_8 = 0.73608431 \times 10^{-7}$ Sixth surface: Aspheric $K = 0$
$\alpha_4 = -0.29921502 \times 10^{-4}$
$\alpha_6 = 0.17753430 \times 10^{-5}$
$\alpha_8 = -0.41314155 \times 10^{-7}$
$\alpha_{10} = 0.49999999 \times 10^{-9}$ Ninth surface: Aspheric $K = 0$
$\alpha_4 = -0.59862508 \times 10^{-4}$
$\alpha_6 = 0.57075458 \times 10^{-6}$
$\alpha_8 = -0.54521998 \times 10^{-8}$
$\alpha_{10} = 0.19963241 \times 10^{-10}$ The values of FNo., f, fB, ω and d5 vary with zooming, as shown in Table 6 below.

TABLE 6

| FNo. | 4.5 | 6.3 | 8.5 |
|---|---|---|---|
| f | 35.85 | 50.00 | 68.00 |
| fB | 11.35 | 23.58 | 39.13 |
| ω | 30.5 | 23.0 | 17.5 |
| d5 | 8.47 | 5.24 | 3.07 |

Example 4

Figure 13:
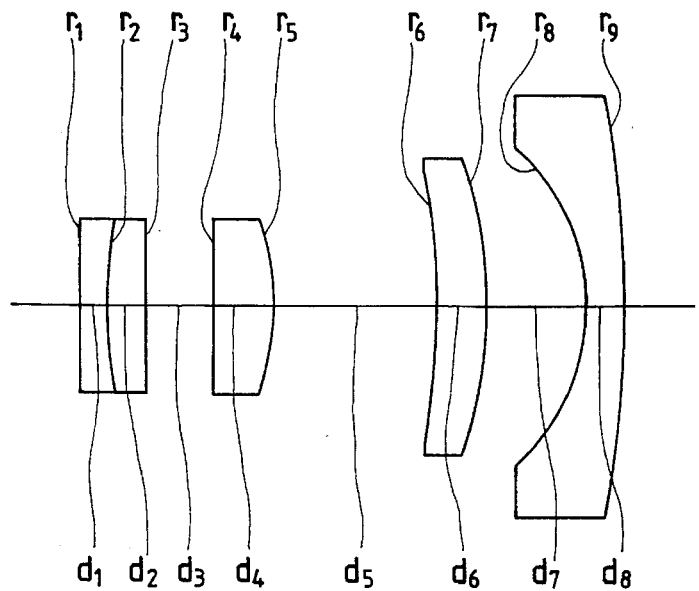
FIG. 13 is a simplified cross-sectional view of the zoom lens system according to Example 4 at the wide-angle end.
Figure 14:
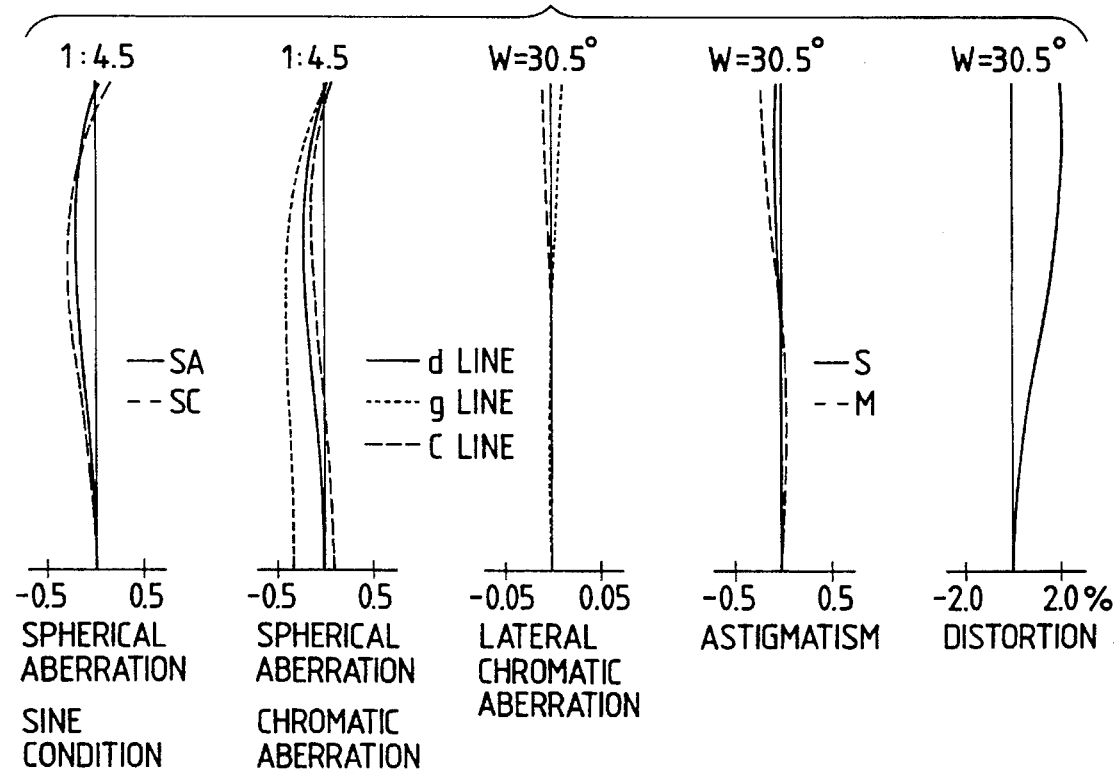
FIG. 14 illustrates a set of graphs plotting the aberration curves obtained with the lens system of Example 4 at the wide-angle end.
Figure 15:
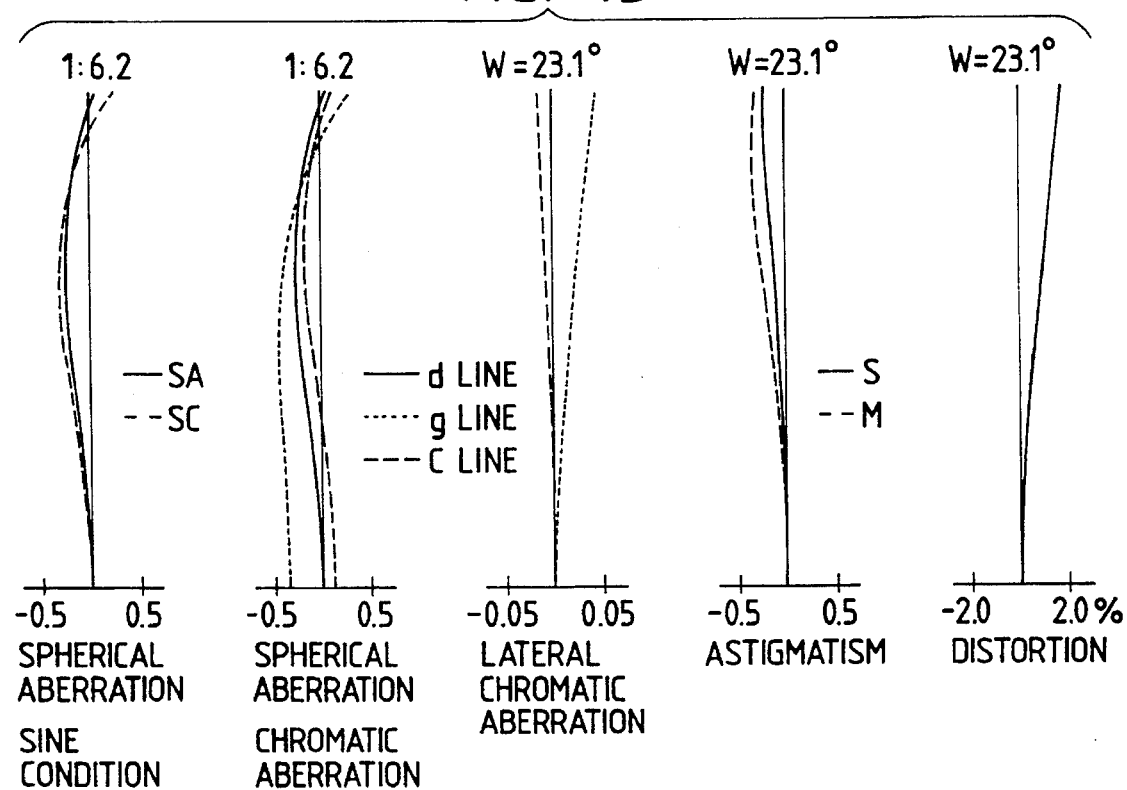
FIG. 15 illustrates a set of graphs plotting the aberration curves obtained with the lens system of Example 4 at the middle-angle end.
Figure 16:
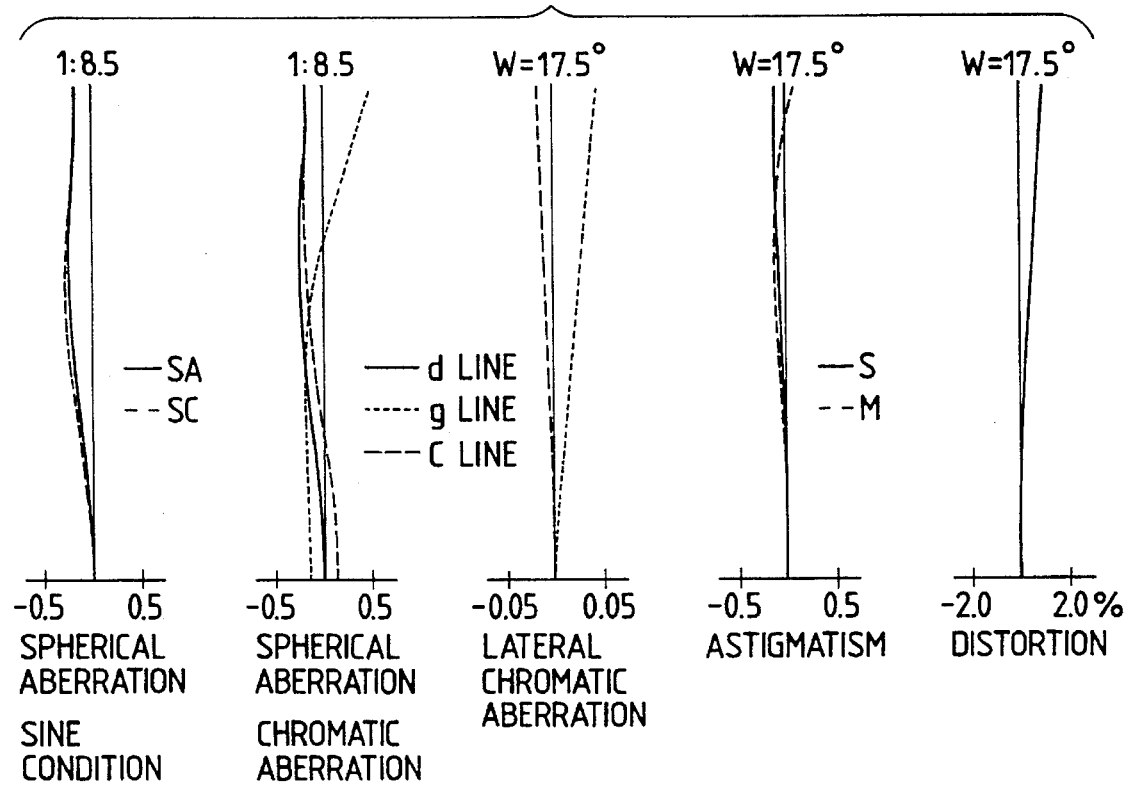
FIG. 16 illustrates a set of graphs plotting the aberration curves obtained with the lens system of Example 4 at the narrow-angle end.

FIG. 13 is a simplified cross-sectional view of the zoom lens system according to Example 4 at the wide-angle end. Specific data for this example are as shown in Table 7. The aberration curves obtained with this lens system at the wide-angle, middle-angle and narrow-angle ends are plotted in FIGS. 14, 15 and 16, respectively.

TABLE 7

| Surface No. | r | d | n | ν |
|---|---|---|---|---|
| 1* | 63.664 | 1.30 | 1.80100 | 35.0 |
| 2 | 19.256 | 2.00 | 1.72916 | 54.7 |
| 3* | 57.630 | 3.34 | | |
| 4* | 92.721 | 3.00 | 1.51728 | 69.6 |
| 5 | −11.731 | Variable | | |
| 6* | −29.116 | 2.50 | 1.58547 | 29.9 |
| 7 | −19.623 | 4.75 | | |
| 8 | −10.000 | 1.80 | 1.77250 | 49.6 |
| 9* | −65.660 | | | |

First surface: Aspheric $K = 0$
$\alpha_4 = -0.37335714 \times 10^{-3}$
$\alpha_6 = -0.23381363 \times 10^{-5}$
$\alpha_8 = 0$ Fourth surface: Aspheric $K = 0$
$\alpha_4 = -0.23135254 \times 10^{-3}$
$\alpha_6 = 0.25132805 \times 10^{-7}$
$\alpha_8 = 0$ Third surface: Aspheric $K = 0$
$\alpha_4 = -0.50000002 \times 10^{-3}$
$\alpha_6 = 0.78892879 \times 10^{-6}$
$\alpha_8 = 0$ Sixth surface: Aspheric $K = 0$
$\alpha_4 = 0.43305326 \times 10^{-4}$
$\alpha_6 = 0.10069011 \times 10^{-5}$
$\alpha_8 = 0.16350554 \times 10^{-8}$ Ninth surface: Aspheric $K = 0$
$\alpha_4 = -0.27770270 \times 10^{-4}$
$\alpha_6 = 0.78884771 \times 10^{-7}$
$\alpha_8 = 0$ The values of FNo., f, fB, ω and d5 vary with zooming, as shown in Table 8 below.

TABLE 8

| FNo. | 4.5 | 6.2 | 8.5 |
|---|---|---|---|
| f | 36.05 | 50.00 | 68.00 |
| fB | 11.30 | 23.35 | 38.90 |
| ω | 30.5 | 23.1 | 17.5 |
| d5 | 7.91 | 4.69 | 2.49 |

Example 5

Figure 17:
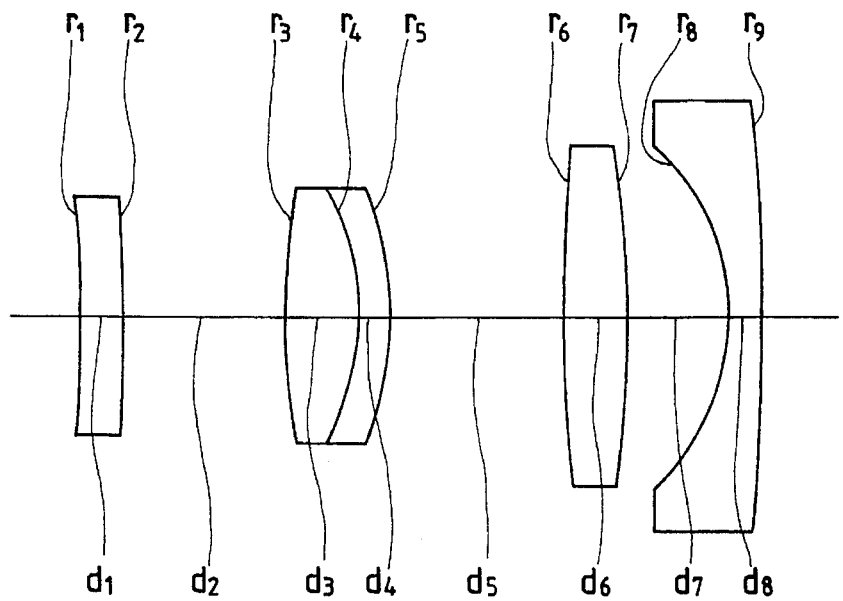
FIG. 17 is a simplified cross-sectional view of the zoom lens system according to Example 5 at the wide-angle end.
Figure 18:
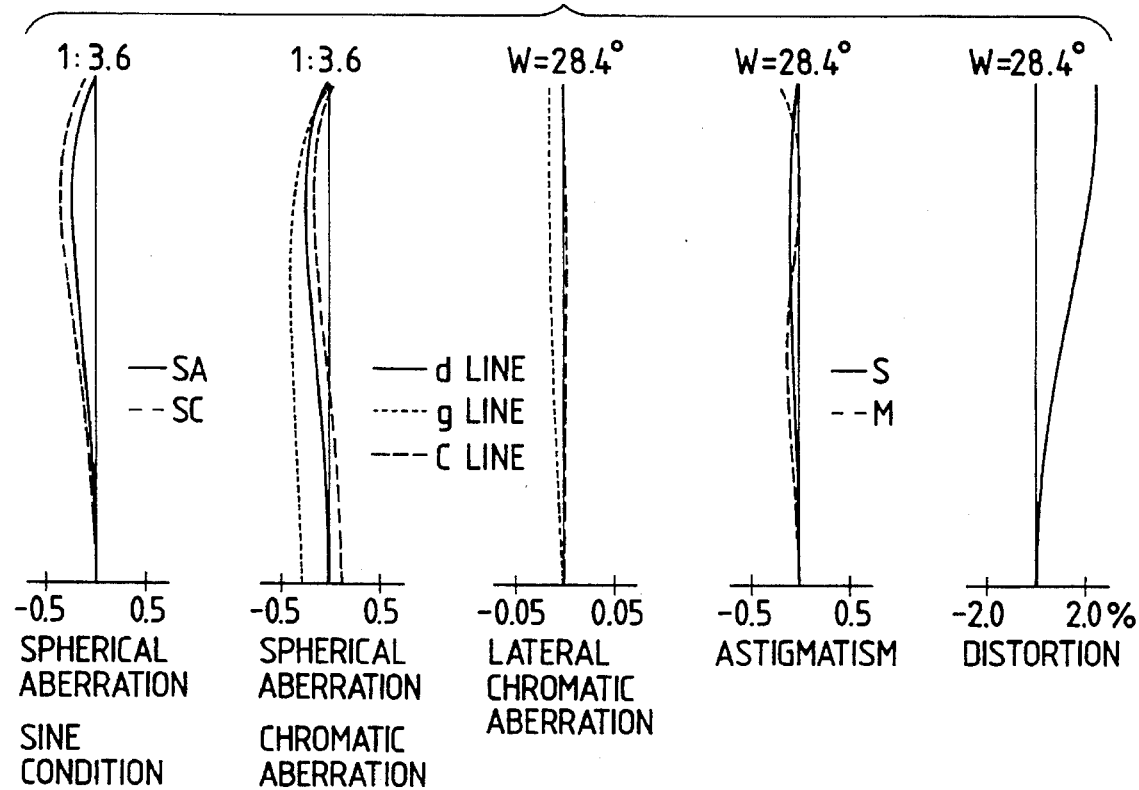
FIG. 18 illustrates a set of graphs plotting the aberration curves obtained with the lens system of Example 5 at the wide-angle end.
Figure 19:
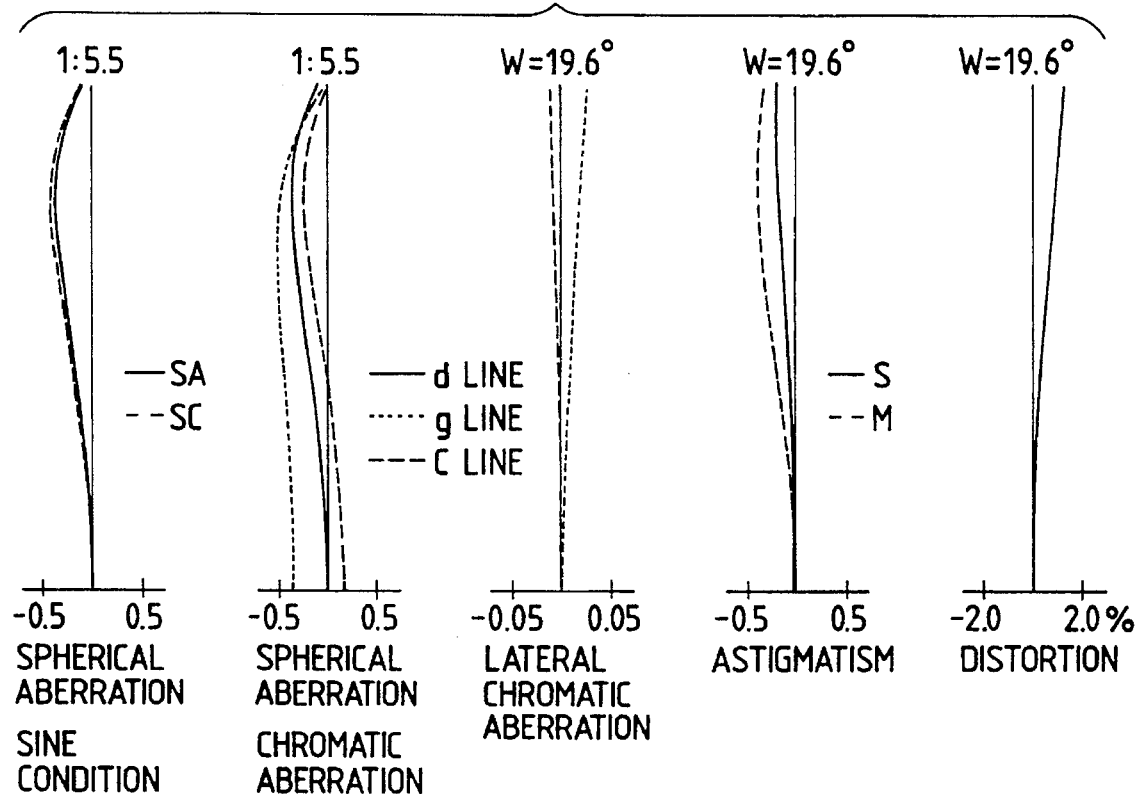
FIG. 19 illustrates a set of graphs plotting the aberration curves obtained with the lens system of Example 5 at the middle-angle end.
Figure 20:
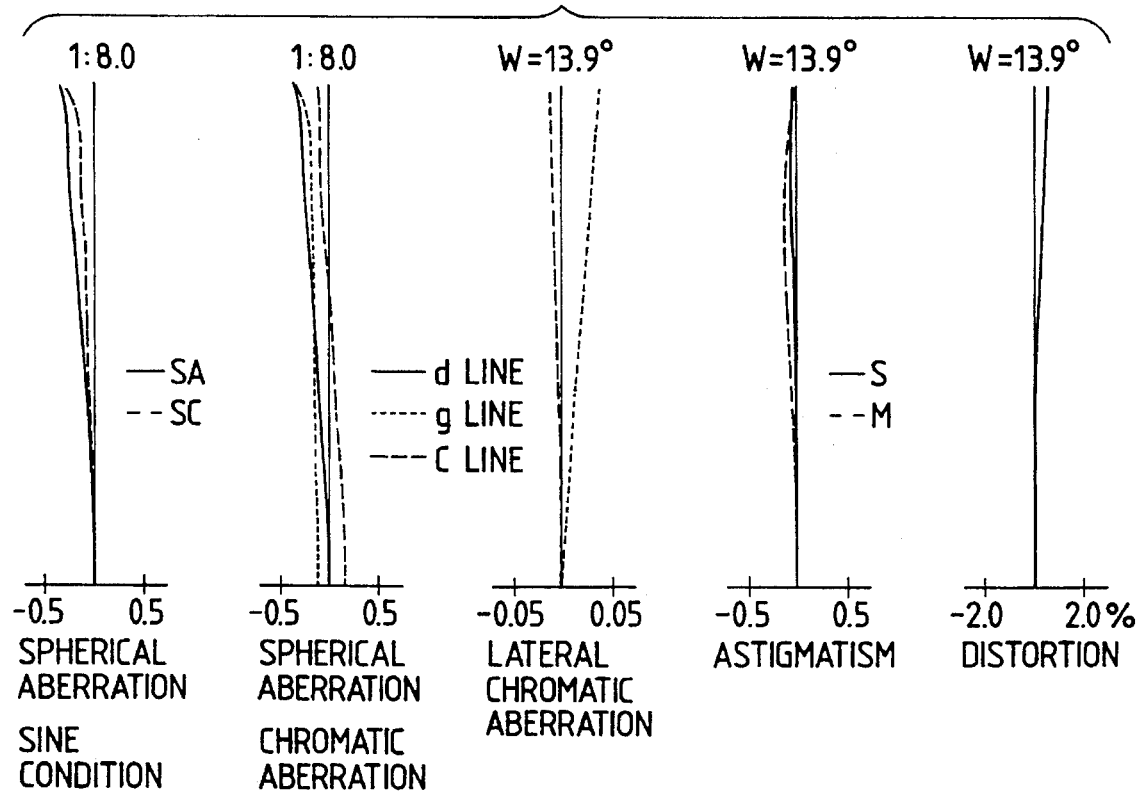
FIG. 20 illustrates a set of graphs plotting the aberration curves obtained with the lens system of Example 5 at the narrow-angle end.

FIG. 17 is a simplified cross-sectional view of the zoom lens system according to Example 5 at the wide-angle end. Specific data for this example are as shown in Table 9. The aberration curves obtained with this lens system at the wide-angle, middle-angle and narrow-angle ends are plotted in FIGS. 18, 19 and 20, respectively.

TABLE 9

| Surface No. | r | d | n | ν |
|---|---|---|---|---|
| 1* | −267.945 | 2.00 | 1.75520 | 27.5 |
| 2* | 860.692 | 7.79 | | |
| 3 | 32.888 | 3.50 | 1.51633 | 64.1 |
| 4 | −12.150 | 1.50 | 1.80518 | 25.4 |
| 5* | −15.614 | Variable | | |
| 6* | 357.749 | 3.00 | 1.58547 | 29.9 |
| 7 | −48.998 | 4.81 | | |
| 8 | −10.688 | 1.50 | 1.77250 | 49.6 |
| 9 | −113.863 | | | |

First surface: Aspheric $K = 0$
$\alpha_4 = -0.16637679 \times 10^{-3}$
$\alpha_6 = -0.12474394 \times 10^{-5}$
$\alpha_8 = -0.25899414 \times 10^{-7}$ Second surface: Aspheric $K = 0$
$\alpha_4 = 0.13850736 \times 10^{-3}$
$\alpha_6 = -0.93495528 \times 10^{-6}$
$\alpha_8 = 0.28773396 \times 10^{-7}$

TABLE 9-continued

| Surface No. | r | d | n | v |
|---|---|---|---|---|

Fifth surface: Aspheric $K = 0$
$\alpha_4 = 0.242538567 \times 10^{-4}$
$\alpha_6 = 0.64685131 \times 10^{-7}$
$\alpha_8 = -0.20730672 \times 10^{-8}$ Sixth surface: Aspheric $K = 0$
$\alpha_4 = 0.63100489 \times 10^{-4}$
$\alpha_6 = 0.14545819 \times 10^{-6}$
$\alpha_8 = 0.27117914 \times 10^{-8}$ The values of FNo., f, fB, ω and d5 vary with zooming, as shown in Table 10 below.

TABLE 10

| FNo. | 3.6 | 5.5 | 8.0 |
|---|---|---|---|
| f | 39.13 | 60.00 | 87.00 |
| fB | 13.19 | 31.28 | 54.68 |
| ω | 28.4 | 19.6 | 13.9 |
| d5 | 8.33 | 3.72 | 1.03 |

Example 6

Figure 21:
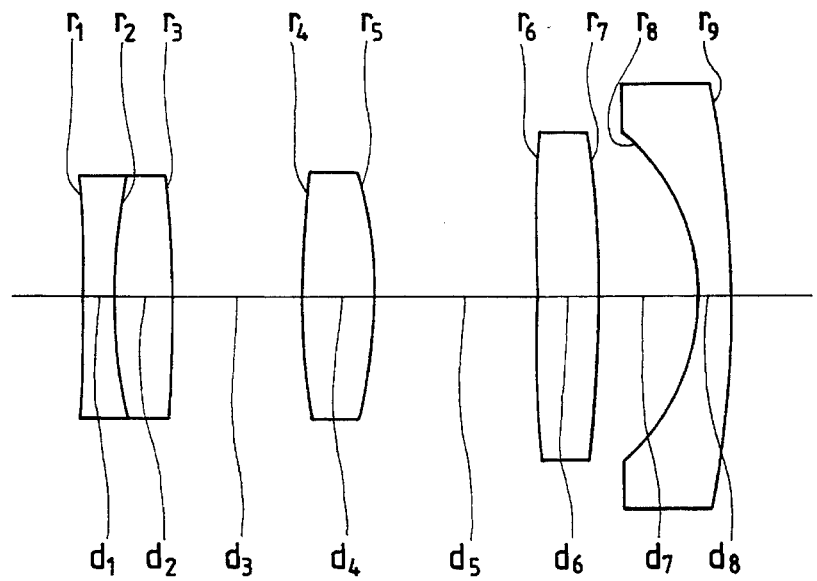
FIG. 21 is a simplified cross-sectional view of the zoom lens system according to Example 6 at the wide-angle end.
Figure 22:
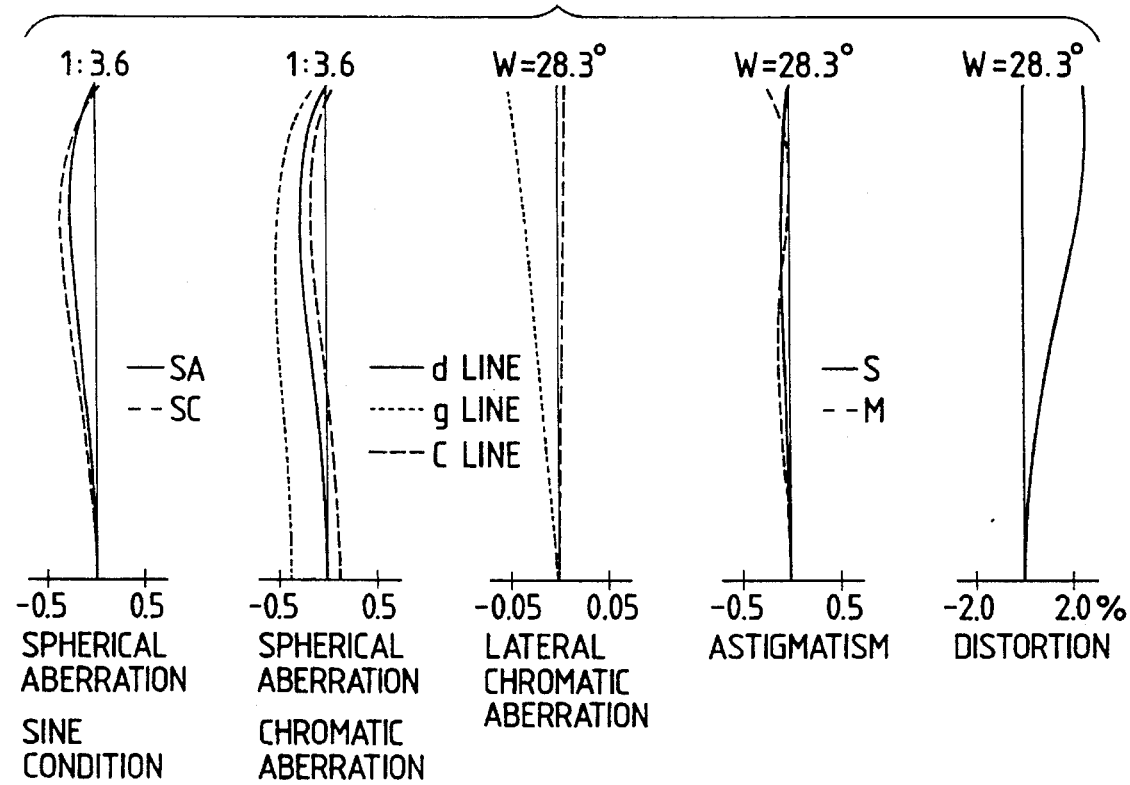
FIG. 22 illustrates a set of graphs plotting the aberration curves obtained with the lens system of Example 6 at the wide-angle end.

FIG. 21 is a simplified cross-sectional view of the zoom lens system according to Example 6 at the wide-angle end. Specific data for this example are as shown in Table 11. The aberration curves obtained with this lens system at the wide-angle, middle-angle and narrow-angle ends are plotted in FIGS. 22, 23 and 24, respectively.

TABLE 11

| Surface No. | r | d | n | v |
|---|---|---|---|---|
| 1* | 223.230 | 1.50 | 1.80100 | 35.0 |
| 2 | 25.220 | 2.80 | 1.60311 | 60.7 |
| 3* | −188.485 | 6.29 | | |
| 4 | 36.285 | 3.50 | 1.55963 | 61.2 |
| 5* | −19.279 | Variable | | |
| 6* | −168.929 | 3.00 | 1.58547 | 29.9 |
| 7 | −53.327 | 4.81 | | |
| 8 | −10.072 | 1.50 | 1.77250 | 49.6 |
| 9 | −53.268 | | | |

First surface: Aspheric $K = 0$
$\alpha_4 = -0.15064565 \times 10^{-3}$
$\alpha_6 = -0.11185335 \times 10^{-5}$
$\alpha_8 = 0.54297900 \times 10^{-8}$ Fifth surface: Aspheric $K = 0$
$\alpha_4 = 0.53898116 \times 10^{-4}$
$\alpha_6 = 0.37592790 \times 10^{-6}$
$\alpha_8 = -0.75734043 \times 10^{-8}$ Third surface: Aspheric $K = 0$
$\alpha_4 = -0.18686928 \times 10^{-3}$
$\alpha_6 = -0.11629641 \times 10^{-5}$
$\alpha_8 = 0.14898899 \times 10^{-7}$ Sixth surface: Aspheric $K = 0$
$\alpha_4 = 0.76097797 \times 10^{-4}$
$\alpha_6 = 0.21590713 \times 10^{-4}$
$\alpha_8 = 0.39379218 \times 10^{-8}$ The values of FNo., f, fB, ω and d5 vary with zooming, as shown in Table 12 below.

TABLE 12

| FNo. | 3.6 | 5.5 | 8.0 |
|---|---|---|---|
| f | 39.16 | 60.00 | 87.00 |
| fB | 12.63 | 29.87 | 52.20 |
| ω | 28.3 | 19.6 | 13.9 |
| d5 | 7.80 | 3.83 | 1.51 |

Example 7

Figure 25:
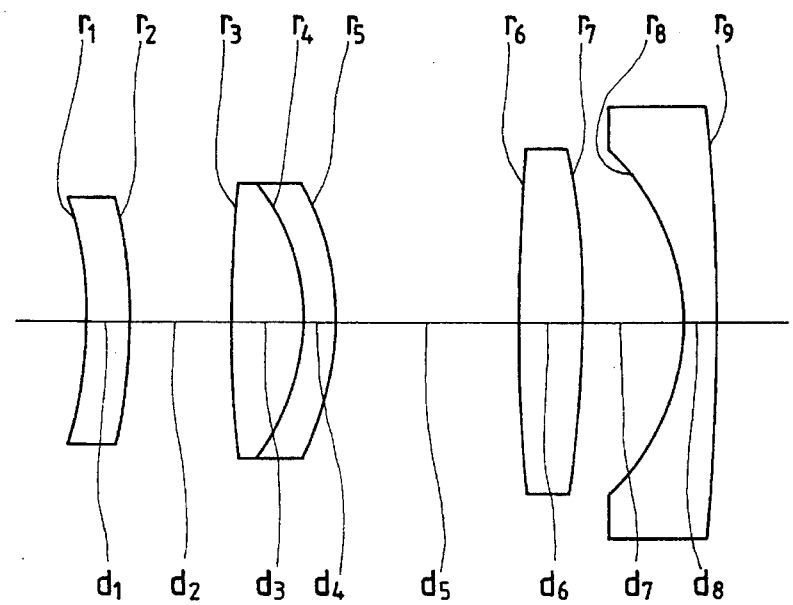
FIG. 25 is a simplified cross-sectional view of the zoom lens system according to Example 7 at the wide-angle end.
Figure 26:
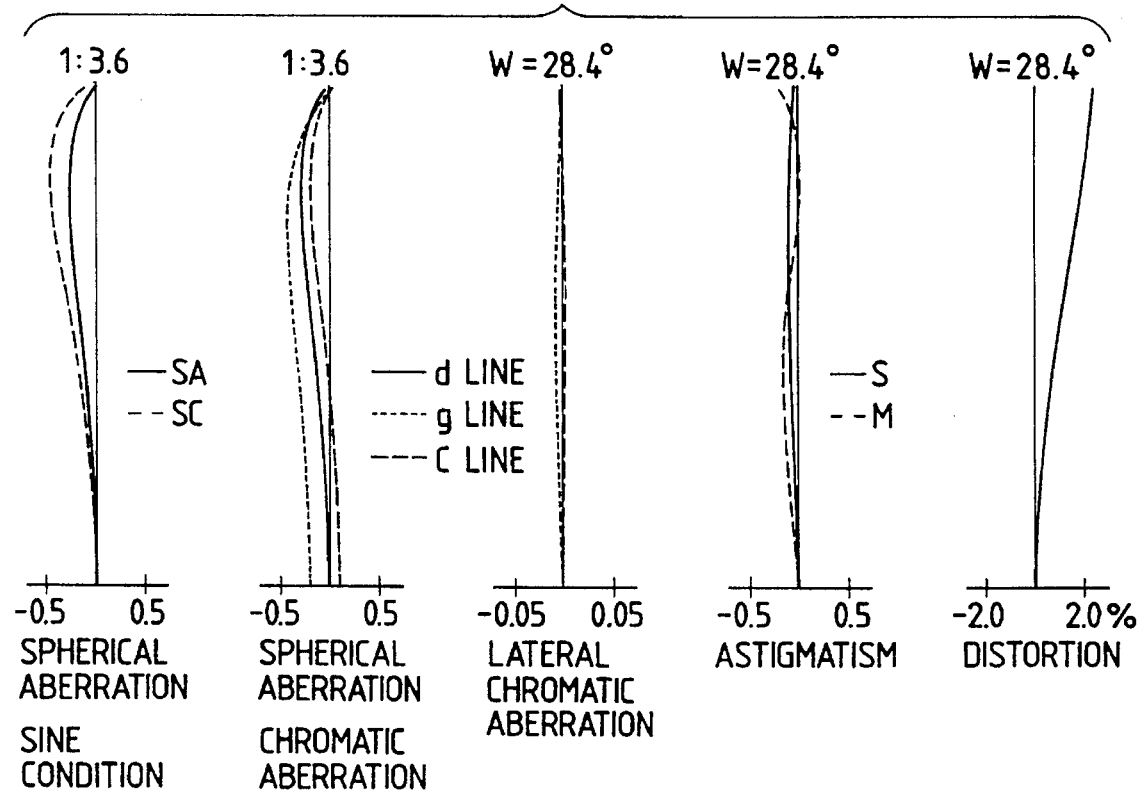
FIG. 26 illustrates a set of graphs plotting the aberration curves obtained with the lens system of Example 7 at the wide-angle end.

FIG. 25 is a simplified cross-sectional view of the zoom lens system according to Example 7 at the wide-angle end. Specific data for this example are as shown in Table 13. The aberration curves obtained with this lens system at the wide-angle, middle-angle and narrow-angle ends are plotted in FIGS. 26, 27 and 28, respectively.

TABLE 13

| Surface No. | r | d | n | v |
|---|---|---|---|---|
| 1* | −26.434 | 2.00 | 1.74950 | 35.3 |
| 2* | −34.072 | 4.88 | | |
| 3* | 44.439 | 3.50 | 1.51633 | 64.1 |
| 4 | −10.041 | 1.50 | 1.80518 | 25.4 |
| 5 | −13.138 | Variable | | |
| 6* | 1280.856 | 3.00 | 1.58547 | 29.9 |
| 7 | −44.442 | 4.74 | | |
| 8 | −10.845 | 1.50 | 1.77250 | 49.6 |
| 9 | −117.602 | | | |

First surface: Aspheric $K = 0$
$\alpha_4 = -0.33992982 \times 10^{-3}$
$\alpha_6 = 0.11890545 \times 10^{-5}$
$\alpha_8 = 0.47529293 \times 10^{-7}$
$\alpha_{10} = -0.25598455 \times 10^{-9}$ Third surface: Aspheric $K = 0$
$\alpha_4 = -0.96392728 \times 10^{-4}$
$\alpha_6 = 0.10985129 \times 10^{-5}$
$\alpha_8 = -0.60582298 \times 10^{-8}$ Second surface: Aspheric $K = 0$
$\alpha_4 = -0.30307845 \times 10^{-3}$
$\alpha_6 = 0.29612906 \times 10^{-5}$
$\alpha_8 = 0.13834532 \times 10^{-7}$ Sixth surface: Aspheric $K = 0$
$\alpha_4 = 0.63255518 \times 10^{-4}$
$\alpha_6 = 0.11434083 \times 10^{-7}$
$\alpha_8 = -0.40663572 \times 10^{-8}$ The values of FN6., f, fB, ω and d5 vary with zooming, as shown in Table 14 below.

TABLE 14

| FNo. | 3.6 | 5.5 | 8.0 |
|---|---|---|---|
| f | 39.13 | 60.00 | 87.00 |
| fB | 14.13 | 32.90 | 57.19 |
| ω | 28.4 | 19.7 | 13.9 |
| d5 | 8.72 | 4.15 | 1.49 |

Example 8

Figure 29:
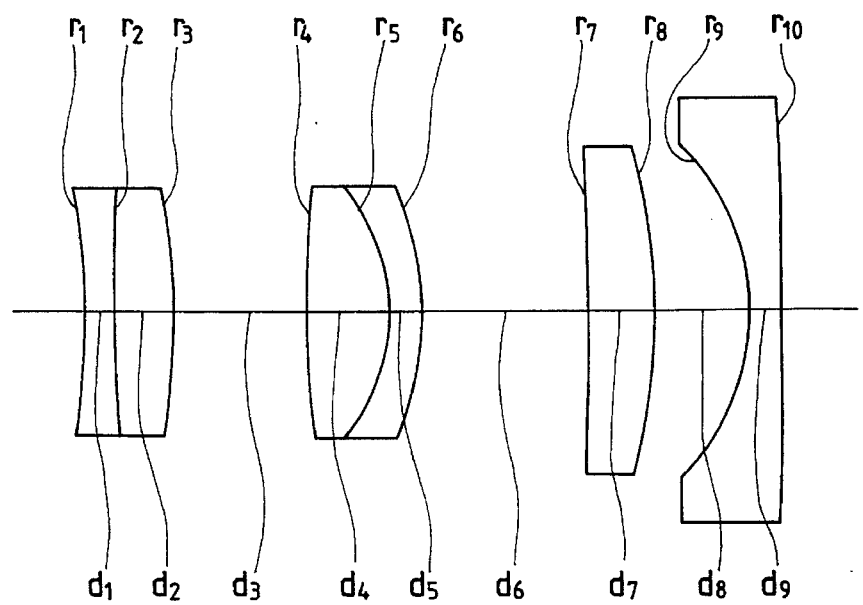
FIG. 29 is a simplified cross-sectional view of the zoom lens system according to Example 8 at the wide-angle end.
Figure 30:
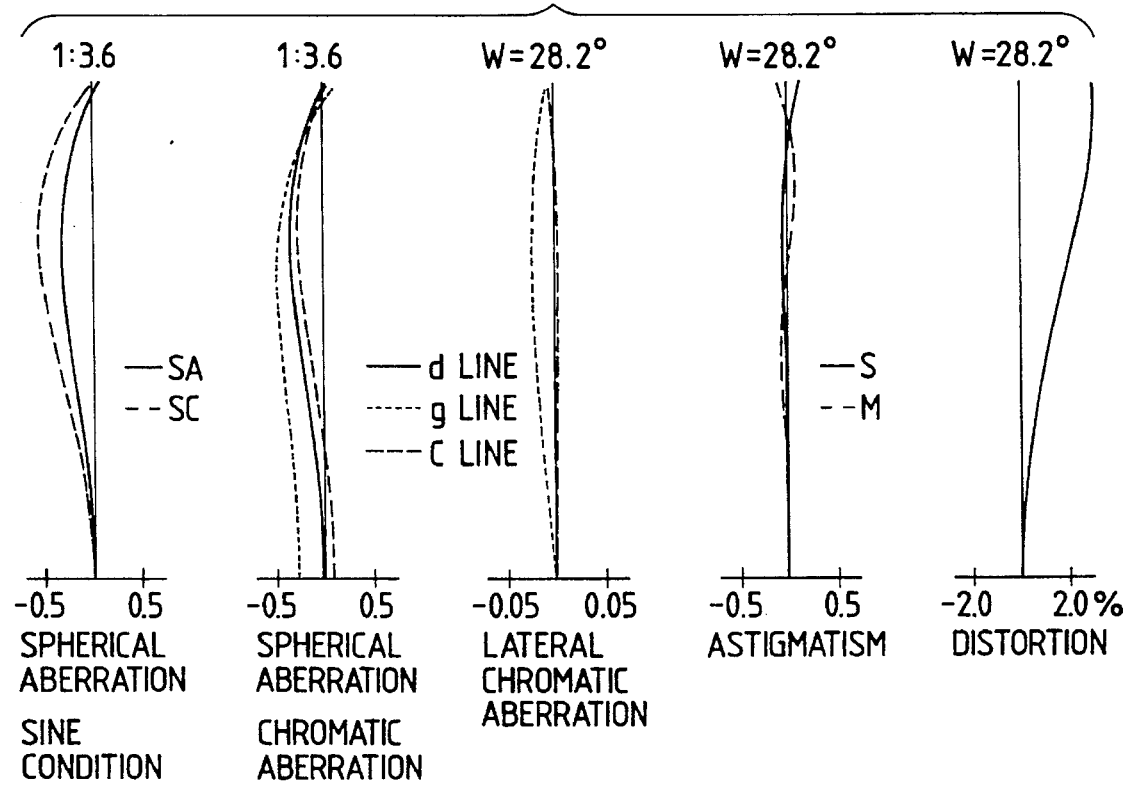
FIG. 30 illustrates a set of graphs plotting the aberration curves obtained with the lens system of Example 8 at the wide-angle end.
Figure 31:
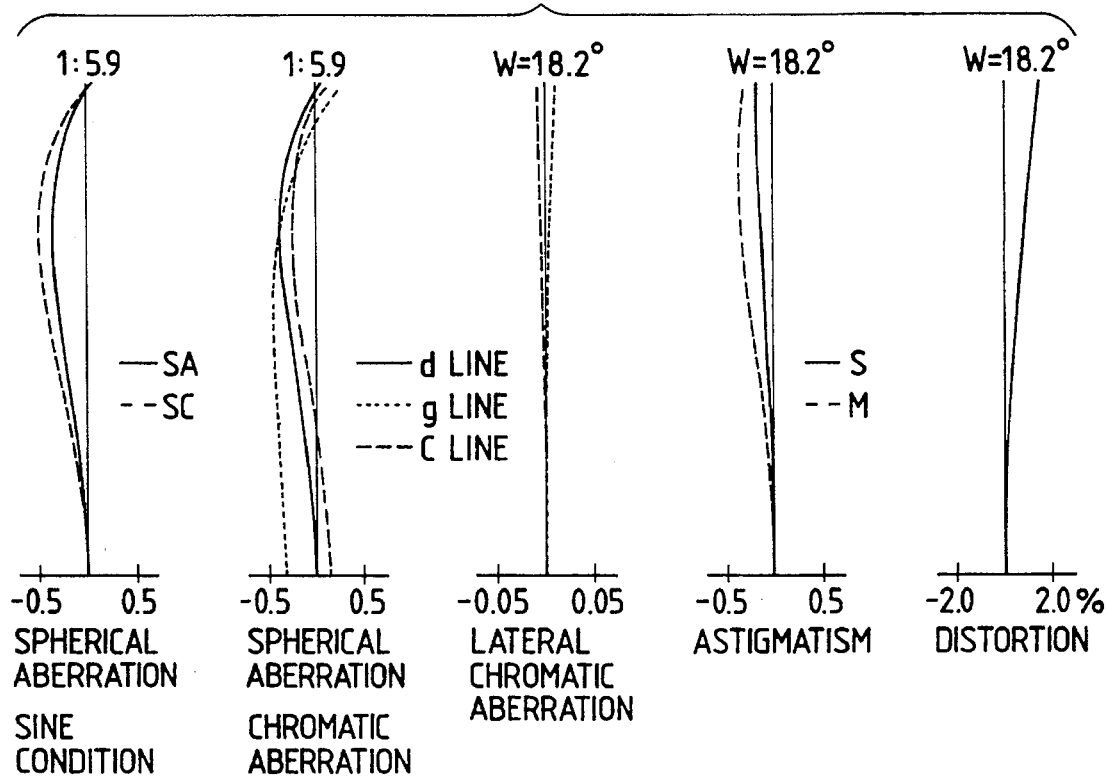
FIG. 31 illustrates a set of graphs plotting the aberration curves obtained with the lens system of Example 8 at the middle-angle end.
Figure 32:
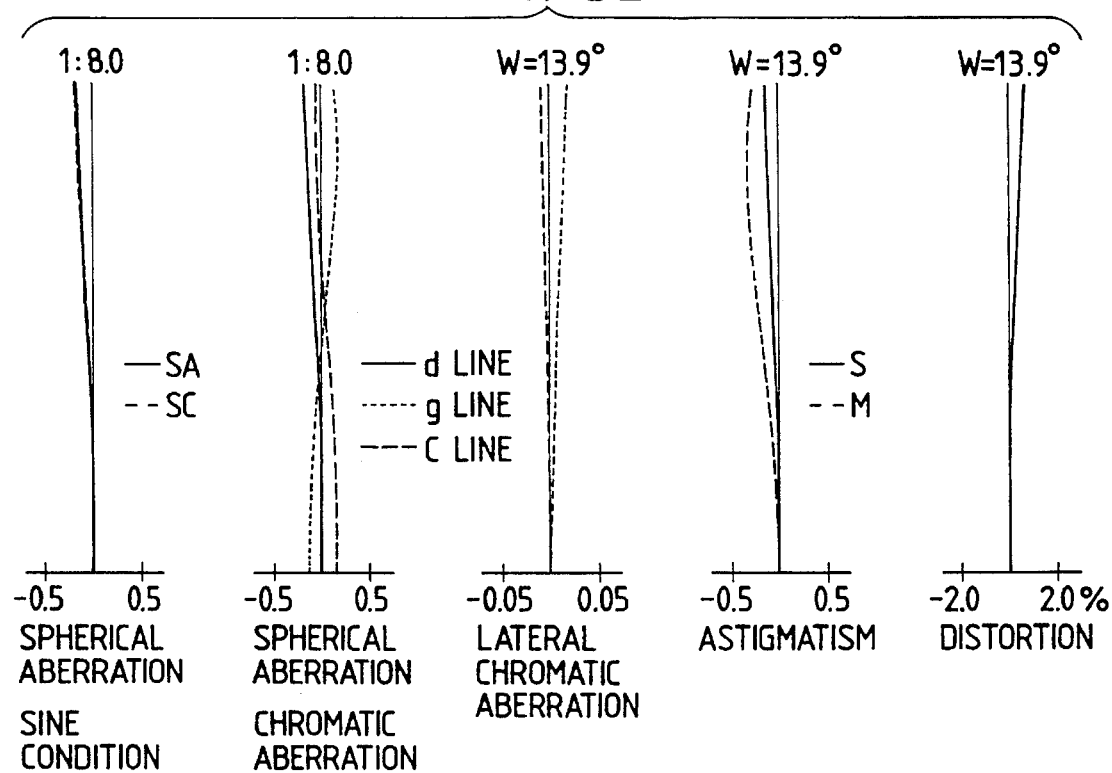
FIG. 32 illustrates a set of graphs plotting the aberration curves obtained with the lens system of Example 8 at the narrow-angle end.

FIG. 29 is a simplified cross-sectional view of the zoom lens system according to Example 8 at the wide-angle end. Specific data for this example are as shown in Table 15. The aberration curves obtained with this lens system at the wide-angle, middle-angle and narrow-angle ends are plotted in FIGS. 30, 31 and 32, respectively.

TABLE 15

| Surface No. | r | d | n | v |
|---|---|---|---|---|
| 1* | −69.265 | 1.50 | 1.80100 | 35.0 |
| 2 | 108.973 | 2.80 | 1.60311 | 60.7 |
| 3* | −43.268 | 6.49 | | |
| 4 | 38.453 | 4.00 | 1.55963 | 61.2 |
| 5 | −9.000 | 1.50 | 1.83481 | 42.7 |
| 6 | −14.802 | Variable | | |
| 7* | −105.868 | 3.15 | 1.58547 | 29.9 |
| 8 | −26.948 | 4.69 | | |
| 9 | −10.612 | 1.50 | 1.77250 | 49.6 |
| 10* | 1012.067 | | | |

First surface: Aspheric    Third surface: Aspheric

TABLE 15-continued

| Surface No. | r | d | n | v |
| --- | --- | --- | --- | --- |

K = 0
$\alpha_4 = -0.14422600 \times 10^{-3}$
$\alpha_6 = -0.38866300 \times 10^{-6}$
$\alpha_8 = 0$
$\alpha_{10} = 0.57327400 \times 10^{-10}$
Fourth surface: Aspheric K = 0
$\alpha_4 = -0.16767500 \times 10^{-3}$
$\alpha_6 = 0$
$\alpha_8 = 0.50306800 \times 10^{-8}$ Seventh surface: Aspheric K = 0
$\alpha_4 = -0.22843900 \times 10^{-4}$
$\alpha_6 = -0.20316900 \times 10^{-6}$
$\alpha_8 = 0.10334300 \times 10^{-7}$ K = 0
$\alpha_4 = 0.24516400 \times 10^{-4}$
$\alpha_6 = 0.86419200 \times 10^{-6}$
$\alpha_8 = -0.15337400 \times 10^{-7}$
$\alpha_{10} = 0.14726400 \times 10^{-9}$ Tenth surface: Aspheric K = 0
$\alpha_4 = -0.35996000 \times 10^{-4}$
$\alpha_6 = 0.31727400 \times 10^{-6}$
$\alpha_8 = -0.29930800 \times 10^{-8}$
$\alpha_{10} = 0.10557300 \times 10^{-10}$ The values of FNo., f, fB, ω and d6 vary with zooming, as shown in Table 16 below.

TABLE 16

| FNo. | 3.6 | 5.9 | 8.0 |
| --- | --- | --- | --- |
| f | 39.18 | 65.00 | 87.00 |
| fB | 12.81 | 33.57 | 51.26 |
| ω | 28.2 | 18.2 | 13.9 |
| d5 | 7.90 | 3.29 | 1.52 |

Table 17 shows values that satisfy the conditions (a1) to (k) in Examples 1–8.

TABLE 17-1

| Condition | Ex. 1 | Ex. 2 | Ex. 3 | Ex. 4 |
| --- | --- | --- | --- | --- |
| fS/fa | −0.20 | −0.21 | −0.55 | −0.13 |
| fS/fb | 1.77 | 1.76 | 2.10 | 1.77 |
| fS/fcb | −1.48 | −1.39 | −0.37 | −0.14 |
| SF1 | −7.0 | −5.8 | 4.6 | 20.1 |
| va | 40.5 | 61.2 | 25.4 | 35.0 |
| vb | 25.4 | 25.4 | — | — |
| ΔV | 0.18 | 0.15 | 0.78 | 0.60 |
| d1/fs | 0.17 | 0.20 | 0.05 | 0.09 |

TABLE 17-2

| Condition | Ex. 5 | Ex. 6 | Ex. 7 | Ex. 8 |
| --- | --- | --- | --- | --- |
| fS/fa | −0.14 | −0.04 | −0.22 | 0.04 |
| fS/fb | 1.67 | 1.70 | 1.33 | 1.57 |
| fS/fcb | −0.93 | −0.31 | −1.13 | −1.20** |
| SF1 | −0.53 | 0.08 | −7.9 | 4.32 |
| va | 27.5 | 35.0 | 35.3 | 35.0 |
| vb | — | — | 25.4 | 42.7 |
| ΔV | 0.68 | 0.83 | 0.45 | 0.88 |
| d1/fS | 0.05 | 0.11 | 0.05 | 0.11 |

**(fS/fca = −0.071)

As described above, the zoom lens system of the present invention is a two-group type including first and second lens groups and the first lens group comprises, in order from the object side, a subgroup 1a having a small power and a subgroup 1b having a large positive power, with at least one of the subgroups 1a and 1b employing a cemented lens whereas at least one lens surface in subgroup 1a being aspheric. Because of this arrangement, the zoom lens system of the present invention is compact and has fewer constituent lens elements as compared to the conventional systems and yet it efficiently corrects chromatic aberrations.

Although the present invention has been fully described by way of the examples thereof with reference to the accompanying drawings, various changes and modifications will be apparent to those having skill in this field without departing from the scope of the invention as defined in the appended claims.

What is claimed is:

1. A zoom lens system, comprising:

in order from the subject side, a first lens group having a positive power; and a second lens group having a negative power, the distance between said first lens group and said second lens group being varied to perform zooming, said first lens group consists of, in order from the object side, a first subgroup and a second subgroup having a positive power, wherein said first subgroup consists of a single lens element having at least one aspheric surface, said second subgroup consists of a cemented lens having a divergent cemented surface, and said first lens group satisfying the following conditions:

$$-0.7 < fS/fla < 0.3$$

$$1.2 < fS/flb < 2.3$$

$$-1.7 < fS/fc < 0$$

where fS: the focal length of the overall system at the wide-angle end;

fla: the focal length of the first subgroup;

flb: the focal length of the second subgroup;

fc: the focal length of the cemented surface in the first lens group and fc=rc/(Nr−Nf); and where rc: the radius of curvature of the cemented surface; and Nr: the refractive index at the d-line of the lens element on the image side of the cemented surface; and Nf: the refractive index at the d-line of the lens element on the object side of the cemented surface.

2. A zoom lens system according to claim 1, wherein said second subgroup includes, in order from the object side, a positive second lens and a negative third lens element cemented together, said first lens group satisfying the following conditions:

$$-0.7 < fS/fla < 0$$

$$-1.7 < fS/fcb < -0.3$$

where fcb: the focal length of the cemented surface in the second subgroup and fcb=rcb/(N3−N2); and where rcb: the radius of curvature of the cemented surface of the second subgroup;

N2: the refractive index of the second lens element at the d-line; and

N3: the refractive index of the third lens at the d-line.

3. A zoom lens system according to claim 2, wherein the negative lens element of said cemented lens comprises an aspheric lens and said cemented lens satisfies the following condition:

$$vb<34$$

where vb: the Abbe number of the negative lens element of the second subgroup.

4. A zoom lens system as recited in claim 1 further comprising:

the single lens element of said first lens group satisfying the following condition:

$$-15<SF1<-0.3$$

where

SF1: the shape factor of the single lens element of the first lens group and $SF1=(r1+r2)/(r1-r2)$; and where r1: the radius of curvature of the first surface of the single lens element; and r2: the radius of curvature of the second surface of the single lens element.

5. A zoom lens system according to claim 1, wherein the aspheric surface in said first subgroup satisfies the following condition:

$$34<va$$

where va: the Abbe number of the lens element, having the aspherical surface, of the first subgroup.

6. A zoom lens system according to claim 1, wherein the aspheric surface in the first subgroup of the first lens group satisfies the following condition:

$$0<\Delta V<2$$

where $\Delta V$: the sum of variations in the coefficient of the third-order distortion due to the aspheric surface in the first subgroup.

7. A zoom lens system according to claim 6, which satisfies the following condition:

$$0.1<d1/fS<0.3$$

where d1: the thickness of the single lens element of the first lens group.

8. A zoom lens system, comprising:

in order from the subject side, a first lens group having a positive power; and a second lens group having a negative power, the distance between said first lens group and said second lens group being varied to perform zooming, said first lens group consists of, in order from the object side, a first subgroup and a second subgroup having a positive power, wherein said first subgroup consists of a cemented lens having a divergent cemented surface, said second subgroup consists of a single lens element, at least one lens surface of said first subgroup being aspheric, and said first lens group satisfying the following conditions:

$$-0.7<fS/fla<0.3$$

$$1.2<fS/flb<2.3$$

$$-1.7<fS/fc<0$$

where fS: the focal length of the overall system at the wide-angle end;

fla: the focal length of the first subgroup;

flb: the focal length of the second subgroup;

fc: the focal length of the cemented surface in the first lens group and $fc=rc/(Nr-Nf)$; and where rc: the radius of curvature of the cemented surface; and Nr: the refractive index at the d-line of the lens element on the image side of the cemented surface; and Nf: the refractive index at the d-line of the lens element on the object side of the cemented surface.

9. A zoom lens system according to claim 8, wherein said first subgroup includes a negative lens element and a positive lens element cemented together, said first lens group satisfying the following conditions:

$$-0.3<fS/fla<0.3$$

$$-0.7<fS/fc<0$$

where

N1: the refractive index of the first lens element at the d-line; and

N2: the refractive index of the second lens element at the d-line.

10. A zoom lens system, comprising:

in order from the subject side, a first lens group having a positive power; and a second lens group having a negative power, the distance between said first lens group and said second lens group being varied to perform zooming, said first lens group consists of, in order from the object side, a first subgroup and a second subgroup having a positive power, wherein said first subgroup consisting of a cemented lens having at least one aspheric surface, said second subgroup consists of a cemented lens having a divergent cemented surface, and said first lens group satisfying the following conditions:

$$-0.7<fS/fla<0.3$$

$$1.2<fS/flb<2.3$$

$$-1.7<fs/fcb<-0.3$$

where fS: the focal length of the overall system at the wide-angle end;

fla: the focal length of the first subgroup;

flb: the focal length of the second subgroup;

fcb: the focal length of the cemented surface in the second subgroup and $fcb=rcb/(N4-N3)$, where rcb is the radius of curvature of the cemented surface of the second subgroup; and where rc: the radius of curvature of the cemented surface; and N3: the refractive index at the d-line of the lens element on the image side of the cemented surface; and N4: the refractive index at the d-line of the lens element on the object side of the cemented surface.

11. A zoom lens system according to claim 10, wherein said first subgroup includes a negative lens element and a positive lens element cemented together, said first lens group satisfying the following conditions:

$-0.3 < fS/f1a < 0.3$ $-1.7 < fS/fcb < -0.3$.

12. A zoom lens system, comprising:

in order from the subject side, a first lens group having a positive power; and a second lens group having a negative power, the distance between said first lens group and said second lens group being varied to perform zooming, said first lens group comprising, in order from the object side, a first subgroup and a second subgroup having a positive power, said first subgroup comprises a single lens element having at least one aspheric surface, said second subgroup comprising a cemented lens which includes a positive first lens and a negative lens element, and which has a positive power and a divergent cemented surface, said first lens group satisfying the following conditions:

$-0.7 < fS/f1a < 0$ $1.2 < fS/f1b < 2.3$ $-1.7 < fS/fcb < -0.3$ where fS: the focal length of the overall system at the wide-angle end;

f1a: the focal length of the first subgroup;

f1b: the focal length of the second subgroup;

fcb: the focal length of the cemented surface in the second subgroup and fcb=rcb/(N3−N2); and where rcb: the radius of curvature of the cemented surface of the second subgroup;

N2: the refractive index of the second lens element at the d-line; and

N3: the refractive index of the third lens at the d-line;

fc: the focal length of the cemented surface in the first lens group and fc=rc/(Nr−Nf); and where rc: the radius of curvature of the cemented surface; and Nr: the refractive index at the d-line of the lens element on the image side of the cemented surface; and Nf: the refractive index at the d-line of the lens element on the object side of the cemented surface.

13. A zoom lens system according to claim 12, wherein the negative lens element of said cemented lens comprises an aspheric lens and said cemented lens satisfies the following condition:

vb<34 where vb: the Abbe number of the negative lens element cemented lens of the second subgroup.

14. A zoom lens system, comprising:

in order from the subject side, a first lens group having a positive power; and a second lens group having a negative power, the distance between said first lens group and said second lens group being varied to perform zooming, said first lens group comprising, in order from the object side, a first subgroup and a second subgroup having a positive power, wherein said first subgroup includes a negative lens element and a positive lens element cemented together and has at least one aspheric surface, said second subgroup having a single lens element having a large positive power, said first lens group satisfying the following conditions:

$-0.7 < fS/f1a < 0.3$ $1.2 < fS/f1b < 2.3$ $-0.7 < fS/fc < 0$ where fS: the focal length of the overall system at the wide-angle end;

f1a: the focal length of the first subgroup;

f1b: the focal length of the second subgroup;

fc: the focal length of the cemented surface in the first subgroup and fc=rc/(Nr−Nf); and where rc: the radius of curvature of the cemented surface; and Nr: the refractive index at the d-line of the lens element on the image side of the cemented surface; and Nf: the refractive index at the d-line of the lens element on the object side of the cemented surface.

15. A zoom lens system, comprising:

in order from the subject side, a first lens group having a positive power; and a second lens group having a negative power, the distance between said first lens group and said second lens group being varied to perform zooming, said first lens group comprising, in order from the object side, a first subgroup and a second subgroup having a positive power, wherein said first subgroup includes a negative lens element and a positive lens element cemented together and has at least one aspheric surface, said second subgroup being a cemented lens having a divergent cemented surface, said first lens group satisfying the following conditions:

$-0.3 < fS/f1a < 0.3$ $1.2 < fS/f1b < 2.3$ $-1.7 < fS/fc < -0.3$ where fS: the focal length of the overall system at the wide-angle end;

f1a: the focal length of the first subgroup;

f1b: the focal length of the second subgroup;

fc: the focal length of the cemented surface in the first lens group and fc=rc/(Nr−Nf); and where rc: the radius of curvature of the cemented surface; and Nr: the refractive index at the d-line of the lens element on the image side of the cemented surface; and Nf: the refractive index at the d-line of the lens element on the object side of the cemented surface.

* * * * *

UNITED STATES PATENT AND TRADEMARK OFFICE
CERTIFICATE OF CORRECTION

PATENT NO. : 5,463,499
DATED : October 31, 1995
INVENTOR(S) : Takayuki Ito, et al.

It is certified that error appears in the above-indentified patent and that said Letters Patent is hereby corrected as shown below:

On the title page, item [21], delete "1,745" and insert --1,742--.

Signed and Sealed this

Twentieth Day of February, 1996

Attest:

BRUCE LEHMAN

Attesting Officer     Commissioner of Patents and Trademarks